(12) United States Patent
Alexander et al.

(10) Patent No.: US 10,135,510 B2
(45) Date of Patent: Nov. 20, 2018

(54) MEANS OF IMPROVING DATA TRANSFER

(71) Applicant: Stratospheric Platforms Limited, Douglas (IM)

(72) Inventors: Paul Alexander, Cambridge (GB); Peter Davidson, Douglas (IM); Andrew Faulkner, Cambridge (GB)

(73) Assignee: Stratospheric Platforms Limited, Douglas (IM)

( * ) Notice: Subject to any disclaimer, the term of this patent is extended or adjusted under 35 U.S.C. 154(b) by 0 days.

(21) Appl. No.: 15/554,666

(22) PCT Filed: Mar. 2, 2016

(86) PCT No.: PCT/GB2016/050541
§ 371 (c)(1),
(2) Date: Aug. 30, 2017

(87) PCT Pub. No.: WO2016/139467
PCT Pub. Date: Sep. 9, 2016

(65) Prior Publication Data
US 2018/0069610 A1    Mar. 8, 2018

(30) Foreign Application Priority Data
Mar. 3, 2015   (GB) .................................. 1503614.8

(51) Int. Cl.
*H04B 7/06* (2006.01)
*H04B 7/024* (2017.01)
(Continued)

(52) U.S. Cl.
CPC .......... *H04B 7/0617* (2013.01); *H04B 7/024* (2013.01); *H04B 7/18504* (2013.01); *H04B 10/118* (2013.01)

(58) Field of Classification Search
CPC .............. H04B 10/118; H04B 10/1121; H04B 7/18504
See application file for complete search history.

(56) References Cited

U.S. PATENT DOCUMENTS

| 5,518,205 A | 5/1996 | Wurst et al. |
| 7,046,934 B2 | 5/2006 | Badesha et al. |

(Continued)

FOREIGN PATENT DOCUMENTS

| GB | 2318947 A | 5/1998 |
| WO | WO 01/059961 A1 | 8/2001 |

(Continued)

OTHER PUBLICATIONS

Dessouky, M. et al., "Optimization of Beams Directions for High Altitude Platforms Cellular Communications Design," The 23$^{rd}$ National Radio Science Conference (NRSC 2006), Faculty of Electronic Engineering, Menoufiya University, Egypt, Mar. 14-16, 2006, pp. C16:1-8.

(Continued)

*Primary Examiner* — Dzung Tran
(74) *Attorney, Agent, or Firm* — Dascenzo Intellectual Property Law, P.C.; Ian D. Gates

(57) ABSTRACT

A process for cooperative aerial inter-antenna beamforming for communication between (a) multiple moving platforms, each platform having an aerial antenna mounted thereon, such that the aerial antennas have variable positions and orientation over time, and (b) at least two ground based antennas; the process involving transmitting data relating to the positions of the aerial antennas to a processing system, the processing system calculating and transmitting beamforming instructions to the ground based antennas, the ground based antennas thereby transmitting or receiving respective component signals for each aerial antenna, the component signals for each aerial antenna received or trans- (Continued)

mitted by the ground based antennas having essentially the same information content but differing in their phase and usually amplitude, so as to form a cooperative beam from the cooperative sum of the signals between the ground based antennas and the at least two aerial antennas.

21 Claims, 11 Drawing Sheets

(51) Int. Cl.
*H04B 7/185* (2006.01)
*H04B 10/118* (2013.01)

(56) References Cited

U.S. PATENT DOCUMENTS

| | | | |
|---|---|---|---|
| 2002/0107034 A1* | 8/2002 | Chang | H04B 7/18504 455/456.2 |
| 2004/0118969 A1 | 6/2004 | MacCready et al. | |
| 2007/0243822 A1* | 10/2007 | Monte | H04B 7/2041 455/12.1 |
| 2011/0006948 A1 | 1/2011 | Larregle et al. | |
| 2011/0312320 A1* | 12/2011 | Moeglein | G01S 19/252 455/426.1 |
| 2014/0168010 A1 | 6/2014 | Mohamadi | |
| 2014/0241239 A1* | 8/2014 | Chang | H04B 7/18506 370/316 |
| 2014/0252156 A1 | 9/2014 | Hiebl et al. | |
| 2014/0286235 A1 | 9/2014 | Chang | |
| 2015/0248711 A1* | 9/2015 | Fournier | B60L 8/003 705/14.71 |

FOREIGN PATENT DOCUMENTS

| | | |
|---|---|---|
| WO | WO 01/080356 A2 | 10/2001 |
| WO | WO 2005/084156 A2 | 9/2005 |
| WO | WO 2007/011978 A1 | 1/2007 |

OTHER PUBLICATIONS

Djuknic, G. et al., "Establishing Wireless Communications Services via High-Altitude Aeronautical Platforms: A Concept Whose Time Has Come?" IEEE Communications Magazine, Sep. 1997, pp. 128-135.

El-Jabu, B. and Steele, R., "Cellular Communications Using Aerial Platforms," IEEE Transactions on Vehicular Technology, vol. 50, No. 3, May 2001, pp. 686-700.

Foo, Y.C. et al., "Other-cell interference and reverse link capacity of high altitude platform station CDMA system," Electronics Letters, vol. 36, No. 22, Oct. 26, 2000, pp. 1881-1882.

Miura, R. and Suzuki, M., "Preliminary Flight Test Program on Telecom and Broadcasting Using High Altitude Platform Stations," Wireless Personal Communications, Kluwer Academic Publishers, vol. 24, No. 2, Jan. 2003, pp. 341-361.

Thornton, J. et al., "Broadband communications from a high-altitude platform: the European HeliNet programme," Electronics & Communication Engineering Journal, Jun. 2001, pp. 138-144.

Tsuji et al., "The Development of Intelligent Beamforming Antenna Systems for Stratospheric Platforms in the Millimeter-Wave Band," Wireless Personal Communications, vol. 32, Feb. 2005, pp. 237-255.

Vialight Communications webpage, downloaded Jul. 28, 2017 from http://www.vialight.de/.

White, George P. and Zakharov, Yuriy V., "Data Communications to Trains From High-Altitude Platforms," IEEE Transactions on Vehicular Technology, vol. 56, No. 4, Jul. 2007, pp. 2253-2266.

Search Report issued in connection with United Kingdom Patent Application No. GB 1503614.8, 2 pages, United Kingdom Intellectual Property Office, dated Jul. 18, 2015.

* cited by examiner

MEANS OF IMPROVING DATA TRANSFER

TECHNICAL FIELD

The invention relates to means of improving backhaul data transfer to and from aerial antennas involved in cooperative beamforming. These are firstly, inter-antenna beamforming from ground based or low altitude antennas with high altitude antennas utilizing multiple phase-array antennas, secondly, the use of polarization information on such beams to and from ground based antennas, and thirdly, the use of free space optical systems or lasers to improve the delivery of precision information services, including telecommunications, earth observation, astronomical and positioning services.

BACKGROUND TO THE INVENTION

High altitude platforms (aircraft and lighter than air structures situated from 10 to 35 km altitude)—HAPS, have been proposed to support a wide variety of applications. Areas of growing interest are for telecommunications, positioning, observation and other information services, and specifically the provision of high speed Internet, e-mail, telephony, televisual services, games, video on demand, and global positioning.

High altitude platforms possess several advantages over satellites as a result of operating much closer to the earth's surface, at typically around 20 km altitude. Geostationary satellites are situated in around 40,000 km altitude, and low earth orbit satellites are usually at around 600 km to 3000 km altitude. Satellites exist at lower altitudes but their lifetime is very limited with consequent economic impact.

The relative nearness of high altitude platforms compared to satellites results in a much shorter time for signals to be transmitted from a source and for a reply to be received (which has an impact on the "latency" of the system. Moreover, high altitude platforms are within the transmission range for standard mobile phones for signal power and signal latency. Any satellite is out of range for normal terrestrial mobile phones operating without especially large or specialist antennas.

High altitude platforms also avoid the rocket propelled launches needed for satellites, with their high acceleration and vibration, as well as high launch failure rates with attendant impact on satellite cost.

Payloads on high altitude platforms can be recovered easily and at modest cost compared to satellite payloads. Shorter development times and lower costs result from less demanding testing requirements.

U.S. Pat. No. 7,046,934 discloses a high altitude balloon for delivering information services in conjunction with a satellite.

US 20040118969 A1, WO 2005084156 A2, U.S. Pat. No. 5,518,205 A, US 2014/0252156 A1, disclose particular designs of high altitude aircraft.

However, there are numerous and significant technical challenges to providing reliable information services from high altitude platforms. Reliability, coverage and data capacity per unit ground area are critical performance criteria for mobile phone, device communication systems, earth observation and positioning services.

Government regulators usually define the frequencies and bandwidth for use by systems transmitting electromagnetic radiation. The shorter the wavelength, the greater the data rates possible for a given fractional bandwidth, but the greater the attenuation through obstructions such as rain or walls, and the more limited diffraction which can be used to provide good coverage. These constraints result in the choice of carrier frequencies of between 0.7 and 5 GHz in most parts of the world with typically a 10 to 200 MHz bandwidth.

There is a demand for high data rates per unit ground area, which is rapidly increasing from the current levels of the order 1-10 Mbps/square kilometer.

To provide high data rates per unit ground area, high altitude unmanned long endurance (HALE) aircraft, or free-flying or tethered aerostats, need to carry large antenna(s) to distinguish between closely based transceivers on the ground. A larger diameter antenna leads to a smaller angular resolution of the system, hence the shorter the distance on the ground that the system can resolve. Ultimately the resolution is determined by the "Rayleigh criterion" well known to those skilled in the art. The greater the antenna resolution, the higher the potential data rates per unit ground area there are.

However fitting extremely large diameter antenna or antennas of 50 meters or more onto platforms is not feasible with current or envisaged aircraft technology.

Phased array digital "beamforming" (DBF) and multi beam horn (MBH) antennas have been considered for high altitude platforms in for example, R. Miura and M. Suzuki, "Preliminary Flight Test Program on Telecom and Broadcasting Using High Altitude Platform Stations," Wireless Pers. Commun., An Int'l. J., Kluwer Academic Publishers, vol. 24, no. 2, January 2003, pp. 341-61. Other references include: http://ieeexplore.ieee.org/xpls/abs_all.jsp?arnumber=620534, http://ieeexplore.ieee.org/xpls/abs_all.jsp?arnumber=933305, http://digital-library.theiet.org/content/journals/10.1049/ecej_20010304, http://digital-library.theiet.org/content/journals/10.1049/el_20001316 http://ieeexplore.ieee.org/xpl/articleDetails.jsp?arnumber=4275149&pageNumber%3D129861 However, the prior art suggest that use of high altitude platforms does not represent a promising way forward to delivering next generation communication means.

SUMMARY OF THE INVENTION

In a first aspect, the invention relates to a process for cooperative aerial inter-antenna beamforming for communication between (a) multiple moving platforms, each platform having an aerial antenna mounted thereon, such that the aerial antennas have variable positions and orientations over time, and (b) at least two ground based antennas; the process involving transmitting data relating to the positions of the aerial antennas to a processing system, the processing system calculating and transmitting beamforming instructions to the ground based antennas, the ground based antennas thereby transmitting or receiving respective component signals for the at least two aerial antennas, the component signals received or transmitted by the ground based antennas having essentially the same information content but differing in their phase and usually amplitude, so as to form a cooperative beam from the cooperative sum of the signals between the ground based antennas and the aerial antennas.

Additionally, the invention relates to a process for cooperative aerial inter-antenna beamforming for communication between at least two aerial antennas, mounted on at least one moving platform, such that the at least two aerial antennas have variable positions and orientation over time, and at least two ground based antennas; the process involving transmitting data relating to the positions of the at least two aerial antennas to a data processing system, a processing system calculating and transmitting beamforming instructions to the ground based antennas, the ground based antennas thereby transmitting or receiving respective component signals for each aerial antenna, the component signals for each aerial antenna received or transmitted by the ground based antennas having essentially the same information content but differing in their phase and usually amplitude, so as to form a cooperative beam from the cooperative sum of the signals between the ground based antennas and the at least two aerial antennas, the resulting cooperative beam thereby having the same or similar properties of a beam formed from a notional single ground based antenna large enough to encompass the positions of the at least two ground based antennas.

By the term "same or similar" is meant properties such as beam size.

In a second aspect, the invention relates to apparatus for providing a communication network, for communication between (a) multiple moving platforms, each platform having an aerial antenna mounted thereon, such that the aerial antennas have a variable position and orientation over time, and (b) at least two ground based antennas; the network involving a data processing system that calculates and transmits beamforming instructions to the ground based antennas, the ground based antennas that transmit or receive respective component signals for each aerial antenna, the component signals for each aerial antenna having essentially the same information content but differing in their phase and usually amplitude, thereby forming a cooperative beam from the cooperative sum of the signals between the ground based antennas and the aerial antennas.

Additionally, the invention relates to apparatus for providing a communication network, for communication between at least two aerial antennas, mounted on at least one moving platform, such that the at least two aerial antennas have a variable position and orientation over time, and at least two ground based antennas; the network involving a data processing system that calculates and transmits beamforming instructions to the ground based antennas, the ground based antennas that transmit or receive respective component signals for each aerial antenna, the component signals for each aerial antenna having essentially the same information content but differing in their phase and usually amplitude, thereby forming a cooperative beam from the cooperative sum of the signals between the ground based antennas and the at least two aerial antennas, the resulting cooperative beam thereby having the same or similar properties of a beam formed from a notional single ground based antenna large enough to encompass the positions of the at least two ground based antennas.

Synthetic aperture synthesis has long been known in radio astronomy where the resolution of a large antenna is synthesized by using the signals from appropriately spaced relatively small antennas. Indeed Martin Ryle and Antony Hewish shared the Nobel prize for physics in 1974 for this and other contributions to the development and use of radio interferometry. Related technology to aperture synthesis has been used for many years in low frequency radio communication to submarines, in acoustics, phased arrays in LTE and WiFi systems. However its use for communication to and from ground based or aerial user equipment has never been previously considered.

Thus, through application of aperture synthesis principles a cooperative beam can be formed that has a narrow width as could be provided by a notional single antenna large enough to encompass the positions of the at least two ground based antennas. As would be known to a person skilled in the art, the larger the notional antenna, the narrower the beam.

Building on techniques developed for the quite remote technical field of radio astronomy it has been discovered that generation of these very narrow cooperative beams can be achieved by altering the phasing and weighting of the various signals sent to or received from each ground based antenna.

The invention exploits the ability of suitable measurement systems to determine the relative position of the ground based antennas, to within a fraction of a wavelength of the electromagnetic radiation being used, even up to GHz frequencies. As described above, with appropriate signal processing to enable "aperture synthesis," similar to that commonly used in radio astronomy, it is then possible to obtain a beam resolution comparable to that of a ground based antenna with a diameter equal to a significant fraction of the maximum separation distance of the ground based antennas. To achieve such aperture synthesis, an antenna's position relative to all the other antennas is preferably determined to within approximately ⅙ of a wavelength, preferably ⅒ of a wavelength, and this has become possible with modern positioning techniques to the accuracy required for the operation of phased arrays for mobile communications.

A key feature of the invention is that three or more ground based antennas in communication with the aerial antennas provides co-operative inter-antenna beam-forming for very targeted communications with individual aerial antennas: the beam used for a single aerial antenna is very small, such that other aerial antennas nearby, within a few tens of meters or less, can also receive or transmit a full bandwidth signal—on the same carrier frequency.

The invention enables an increased use of backhaul bandwidth and thereby a reduced number of ground-based antennas for a given data transfer rate, where the relative position of the ground based or low altitude antennas is known to within better than a quarter of the wavelength used for data transmission and the aerial antennas are so close together that they could not be resolved from one another by the individual ground based antennas.

Backhaul ground stations (BG stations), support the high-speed data links between the aircraft and a system-processing centre.

The benefit of the invention is that the number of BG stations and their associated costs, which can be significant in respect of the overall costs of the communication system, can be reduced if the BG stations have multi-beaming capability so that they can communicate with each platform independently when there is a fleet of platforms in line of sight.

The benefits of the invention increase where inter-aerial antenna beam forming is utilized to allow more effective use of spectrum and/or better beam focusing with UE and a large number—at least 3 but often twenty or more platforms are necessary to carry the aerial antennas—depending on UE data requirements.

In a preferred embodiment of the invention, separated polarization information for the beams communicating to and from aerial antennas can be used to increase the rate of data transfer per BG station.

This involves the use of the two orthogonal polarisations of the transmit and receive beams for backhaul communications between the ground stations and the aerial antennas to provide two separate data streams which increases the data transfer rate on the backhaul links by up to double that of a conventional link. This also reduces the number of ground stations required.

The invention will now be illustrated by way of example particularly with reference to an implementation referred to as "HAP-CELL", which utilises cooperative aerial antenna beamforming, and with reference to the following figures in which:

DESCRIPTION

A glossary of terms is described in Table 3.

The HAP-CELL system supported by the invention can provide high data rate communications to and from UE with an interface to a conventional mobile telecommunications network or Internet.

The HAP-CELL system allows for the support of standard interface specifications and protocols or proprietary interface protocols. In the illustrative example, there is support for communications with standard, unmodified mobile phones, smartphones, tablets or mobile computers as the UEs. Other user devices that could be supported would be transceivers on vehicles, vessels or aircraft, or fixed devices on or inside buildings to enable the connection of electronic devices to the Internet.

The HAP-CELL system is furthermore capable of connecting to the pre-existing mobile phone network and Internet through appropriate interfaces. The communications topology can be arranged in the same fashion as a conventional mobile phone network, and in that case, the present invention can be used as part of a conventional mobile network.

Figure 1:
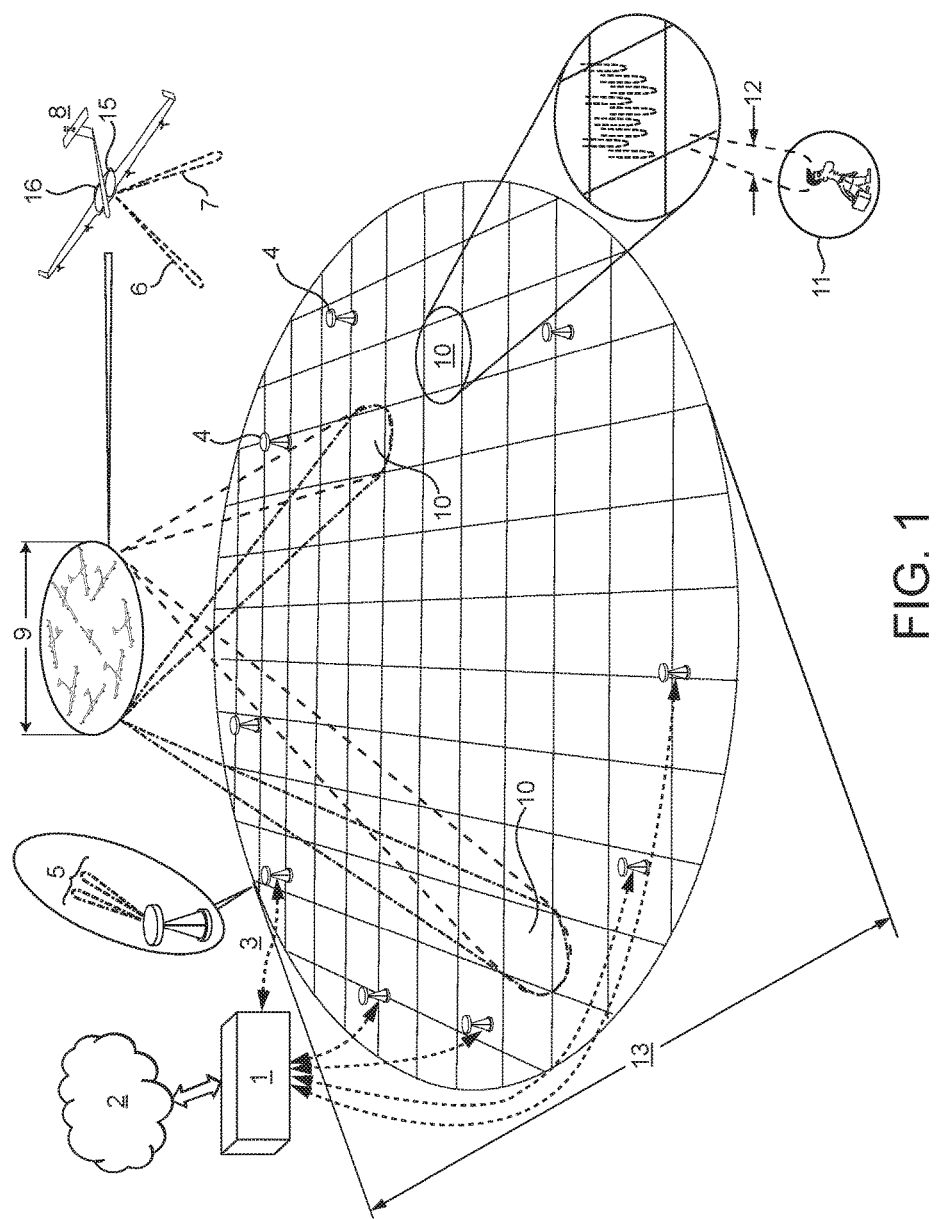
FIG. 1 is a schematic representation of a system according to the invention.

FIG. 1 is a schematic representation of the system. FIG. 1 illustrates just one potential configuration: utilizing multiple aircraft (8) as the platforms to create the constellation of antennas over e.g. approximately a 60 km diameter "Service area" (13).

The system uses a "constellation" of antennas mounted on multiple platforms (9) operating at approximately 20 km altitude. These platforms can be aerostats, tethered or free flying; or manned or unmanned aircraft. In the case of aircraft, they can be solar powered for long endurance at suitable latitudes and seasons, or use hydrogen as a high energy density fuel for applications that require higher-powered equipment or in areas that have limited solar irradiation at particular seasons. Other fuels such as hydrocarbons can be utilized.

In FIG. 1, each aircraft platform (9) supports two antennas (15,16), one used for transmission and one for reception. In one embodiment, the platforms carry phased array systems, or horn antenna systems. These systems, when using beamforming technology, can provide many separate beams (6,7) in different directions to communicate with UEs (11) situated on different "patches" (10), areas illuminated by an antenna beam, and can also provide the "backhaul" links (5) to the "backhaul ground", BG stations (4).

The invention can provide communication links with BG stations (4) to provide the backhaul data communication systems that support the UE activities with the rest of the cellular network. The BG stations can also use phased array systems with beamforming technology to communicate directly with the platforms under the control of a computer processing system, e.g. a ground-based computer processing centre, or simpler dish or horn-based systems. The BG stations can be connected to the ground-based computer processing centres (1) via standard protocols; by fibre optic, or microwave connections or any other physical connection technology (3). For simplicity not all the links to the backhaul stations are shown in FIG. 1.

Figure 5:
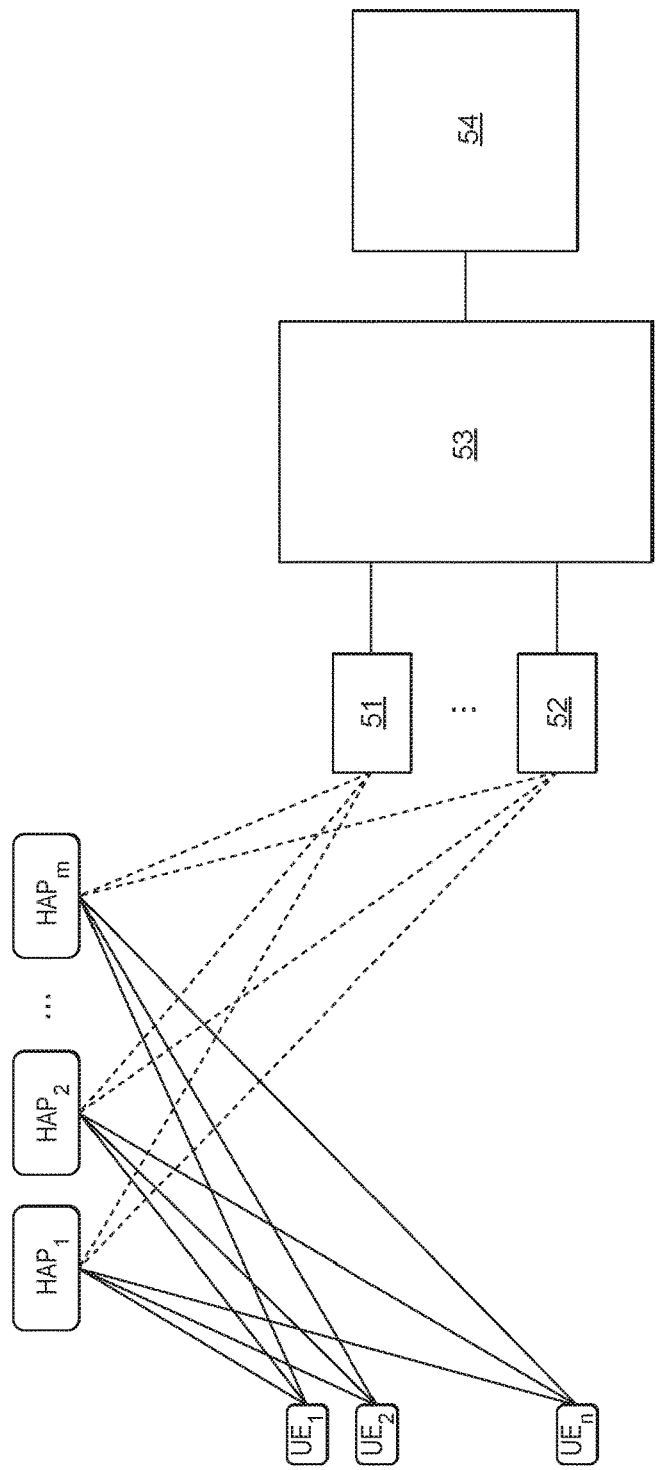
FIG. 5 is a schematic representation of the system arrangement and connection with a mobile telecommunications network.

An illustrative embodiment of the system, as shown in FIG. 5 includes:
1. The platform based phased array antennas, which communicate with the UE ($UE_1$, $UE_2$ to $UE_n$) and BG stations (51,52) supported by aerial platforms (not shown).
2. Optional additional platform based receivers and transmitters that carry the backhaul data links (not shown).
3. The BG stations or other antennas which communicate with the platforms and link to the processing centre.
4. A processing centre (53), which calculates all the parameters for the communication links and provides the interface to the wider cellular network. (54).

Thus, the system provides that a constellation of antennas (normally at least three, but typically fifteen or even many hundred in line of sight within the area in which the ground based UE resides) provide co-operative or inter-platform beamforming for very targeted communications with individual users, see FIG. 1: the beam (12) used for a single user within a particular patch is very small.

Utilizing the system a targeted beam may be formed on a single UE: the intersection of this with the ground can be presented to the mobile network as an individual cell which has the ability to use the full available resources (signal bandwidth and communication power) for communication to a single piece of UE. These cells are termed herein as "dynamic femtocells" or DF-Cells.

Laser Communication and Free Space Optics

In certain locations where the availability of BG stations is low, it may be advantageous to link one aircraft with another more suitably located over BG stations by laser or free space optical devices. These have been developed in recent years and allow high data rate communication (greater than 1 Giga bit per second) with modest (under 100 W) power consumption and can be of modest weight of less than 25 kg but able to communicate in the stratosphere at distances of at least 60 km, and more preferably of 250 km and on occasion of 500 km or more. With such an arrangement it is possible for one or more aerial antennas to be linked to BG stations many hundreds if not thousands of kilometers distant by utilizing laser links between additional aircraft.

Thus, in a preferred embodiment, the invention relates to the use of lasers or free space optical devices to provide a communication link between aerial antennas involved in cooperative inter antenna beamforming.

Figure 11:
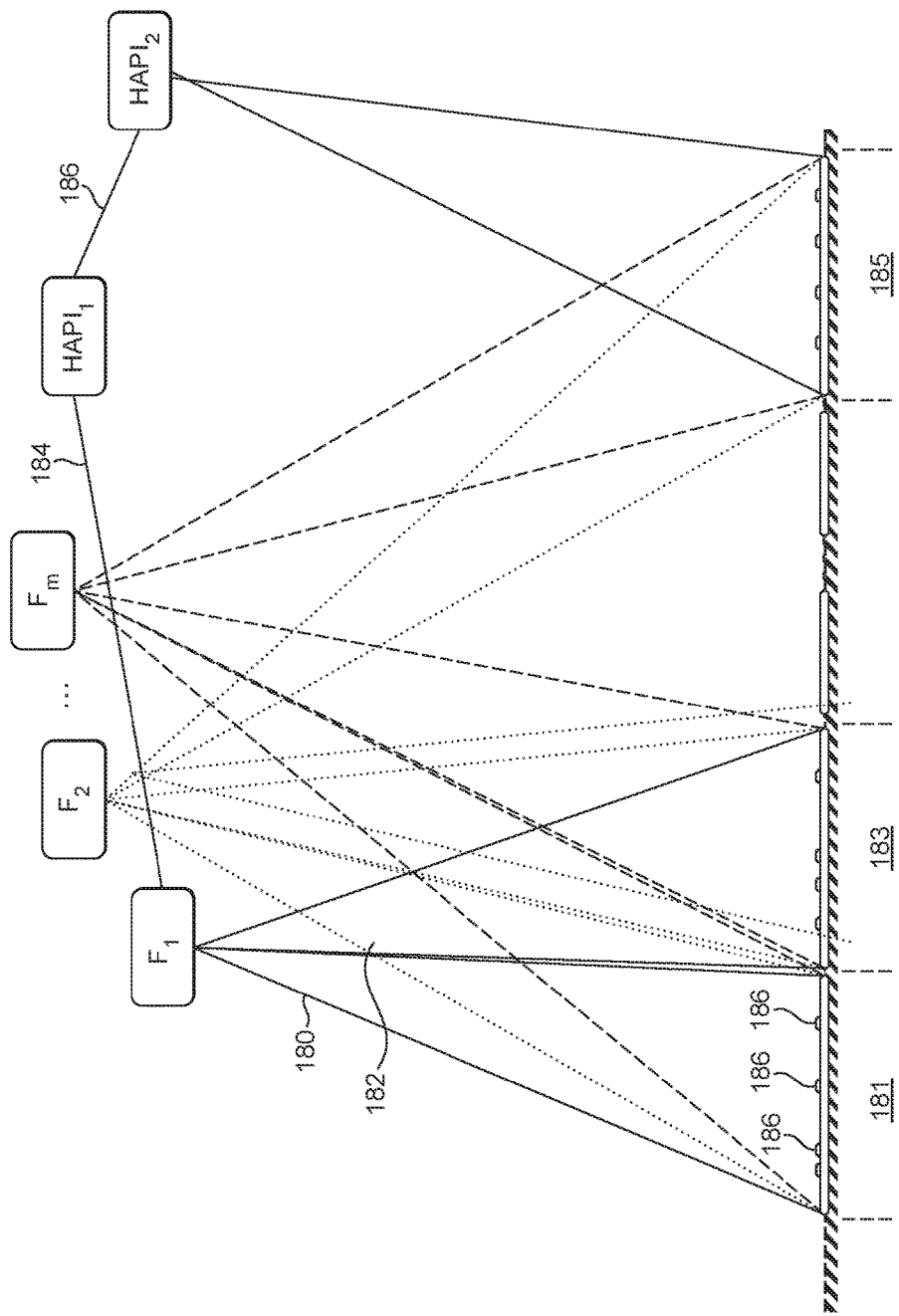
FIG. 11 illustrates backhaul utilizing free space optics.

The use of lasers and free space optics for high altitude aircraft is well known to those skilled in the art as shown for example in http://www.vialight.de This is illustrated in FIG. 11, which shows beam formation and backhaul arrangements in the service area, by antennas on fleets of platforms labelled $F_1$, $F_2$ to $F_m$. The antenna on $F_1$ is shown producing two collections of beams (180, and 182), which are directed at two areas (181, and 183). $F_2$ to $F_m$ are in line of sight of BG stations in area 185 and communicate directly with them.

However the antennas on platforms in fleet $F_1$ are not in line of sight of any BG stations so backhaul to and from BG stations is passed by laser communications (184) to an intermediate high altitude platform $HAPI_1$, which in turn communicates (186) to a second intermediate high altitude platform $HAPI_2$, which then is in communication with BG ground stations in patch 185.

$HAPI_2$ could also be a high altitude platform on a tethered aerostat and be directly linked to the ground via an optical fibre.

The use of Free Space Optical devices or lasers to communicate between aerial antennas is used to promote data transfer from areas where there are limited or no ground based communication links, for example over large areas of water, desert or undeveloped land to aerial antennas which can be situated where there are suitable ground based links which can be reached by microwave transmission to and from the aerial antennas.

With high altitude aircraft high aspect ratio wings are necessary to provide the low drag needed for such aircraft to have sufficient endurance to allow sustained station holding—weeks rather than days. Aspect ratios of at least 20:1, preferably 30:1 are needed. These long wings can easily interrupt, with very modest yaw, or roll, almost horizontal—within 5 degrees of the horizontal—laser transmissions which are required for long distance—over 100 km—communication between aircraft platforms. To avoid this it has been discovered that a suitable control system is needed which identifies the direction and alignment of communication laser beams in operation and interfaces with the aircraft attitude control system to ensure that the plane attitude avoids interruption of the laser beams by angled wings or winglets.

When such lasers or free space optics are employed it has been discovered that a sophisticated control system is required for the high altitude platforms to ensure that the attitude of the aircraft does not bring wings or wing-tips to obstruct the laser beam(s) used for communication. In normal aircraft communications by lasers, the communication is downwards or by aircraft with relatively small wing spans and so with suitable siting of the laser transmitters and receivers it is relatively easy to maintain un-obscured communication.

For the case of autonomous high aircraft engaged in cooperative inter antenna beam forming, the direction of the laser beams and the position of the aircraft needs to modify the autonomous system outputs to ensure by changing pitch, yaw and roll, as well as flight path, that uninterrupted communication is permitted.

The communication of particular data, applications and content may have deleterious effects on user equipment or particular users, for example, children. The present system allows a system operator to introduce checks in the processing centre or elsewhere on data, applications and content to protect user equipment or particular users.

Thus, in a further aspect the invention relates to a method of receiving and/or transmitting data, applications and/or content to an antenna on user equipment, the method utilising the network or process as described herein.

The present system allows for much more precise identification of geographic location within a wide area coverage, along with higher data rates, than current systems.

Currently in macrocells outside urban areas other than by using an additional system such as differential GNSS e.g., GPS, GLONAS and GALILEO, locations are difficult to establish to less than tens if not hundreds of meters. Even within urban areas with microcells locations of 10 m or less are difficult to obtain.

Within a large area accessible by a constellation of antennas, location can often be identified within meters and even to sub-meter resolution, dependent on propagation conditions. This allows the system at the resolution of rooms or buildings the capability to restrict access to specific or general user equipment on a continuous or intermittent basis.

Such an access capability has the potential to allow appropriate authorities within properties over which they have suitable rights to restrict or modify access, for example to control under age or visitor access in specific rooms, at specific times or continuously. This capability also has the ability to readily provide information on the location of the user equipment to another party contacting another piece of user equipment.

Thus, in a further aspect, the invention relates to a process for the management of access to the process described herein by specifying the location and/or time that will permit the transmission or reception of information to that location.

Phased Array Antennas and Inter-Antenna Beamforming Technology

The UE may include transmitters or receivers or both. The ground-based and aerial antennas can be phased arrays or conventional antennas or both.

As discussed above, the HAP-CELL system involves the use of advanced phased arrays, which enable "intra-array beamforming" or beamforming within a single antenna. There follows a brief description of these technologies.

Phased arrays consist of a large number of individual antenna elements, but in the rest of this document "antenna(s)" will refer to one or more phased arrays or one or more conventional individual antenna(s) such as a horn antenna(s).

Phased arrays have a particular advantage for high altitude aircraft and other platforms in that their aspect ratio, the ratio of their width to depth is generally low, and thereby often easier to mount in a structure where low aerodynamic drag is required.

Antenna(s) mounted on high altitude platforms can communicate both to and from UE, not primarily connected other than via the high altitude platform antenna(s) with a large ground based communication network such as the internet or a cellular network. Such antenna(s) can also communicate with backhaul ground based stations ("BG stations") which are directly connected to a large ground based communication network and provide "backhaul" known to those skilled in the art.

The UE may include transmitters or receivers or both. The aerial antennas can be phased arrays or conventional antennas or both.

Figure 2:
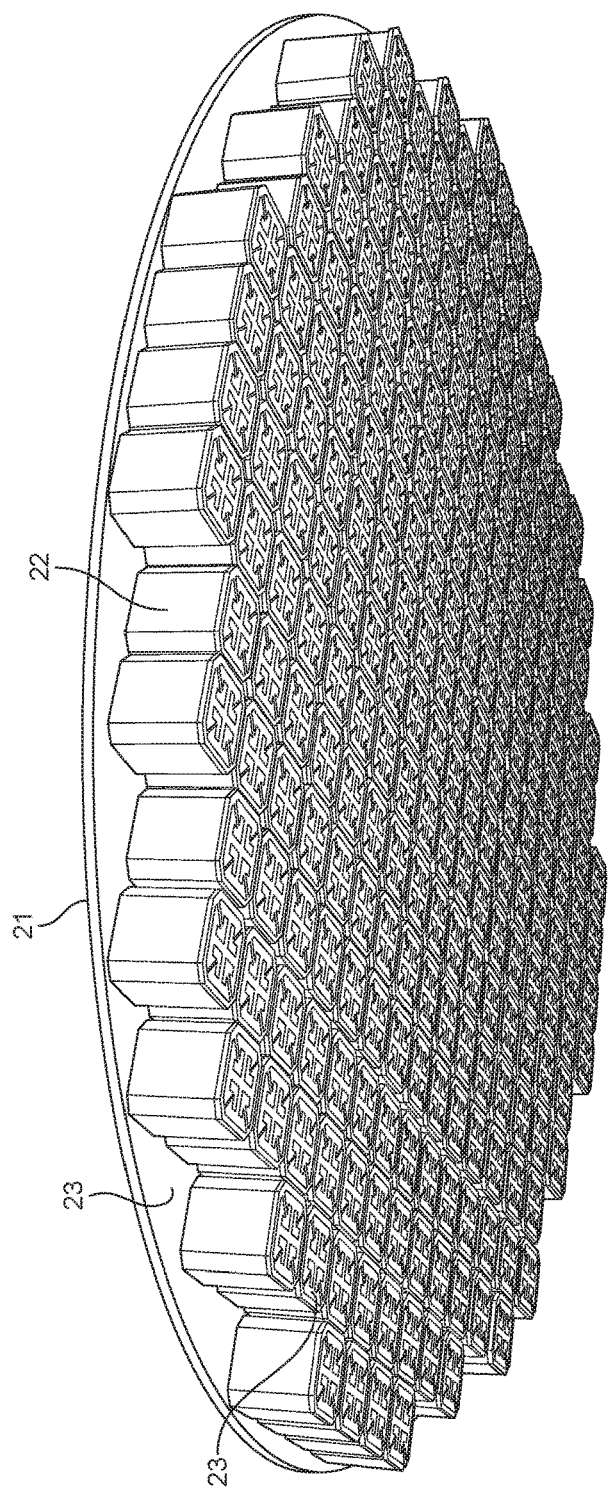
FIG. 2 is an illustration of a phased array.

FIG. 2 is an illustration of a small phased array (21). It has an array of small antenna elements (22), which are connected to either the input of low noise amplifiers prior to digitization as a receiving system or to output amplifiers for transmission. Each antenna element is used independently and by controlling the precise time, or phase, of a signal between elements, a beam can be formed in a similar fashion as with a parabolic dish. The phased array may be designed so the antenna elements are all planar, as shown in FIG. 2 where two or more layers (23) define the electromagnetic performance. The phased array can also be a more complex shape, for example, "bowed" so that the outermost elements are pointing at an angle to the axis of the array.

Figure 3:
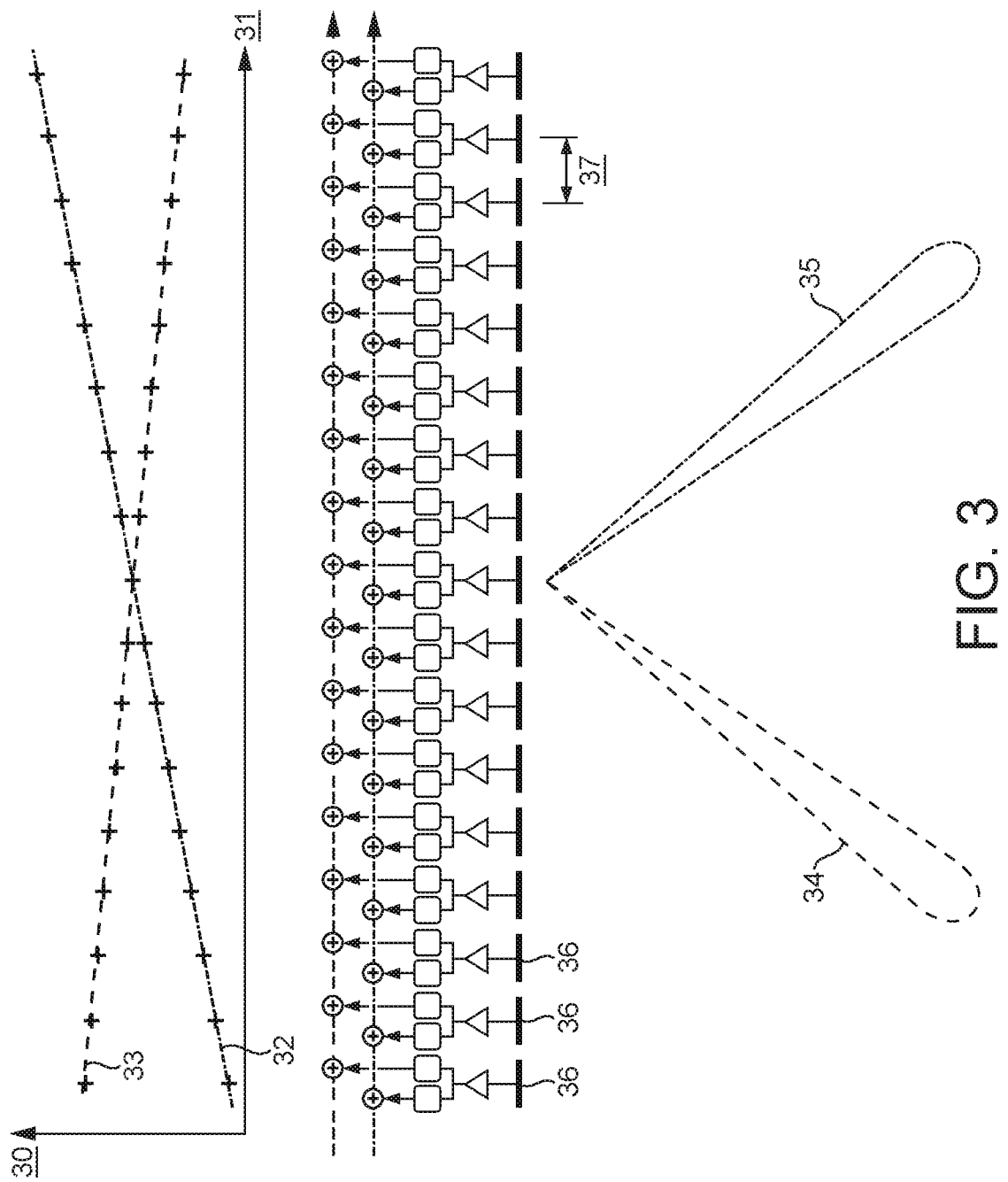
FIG. 3 illustrates beam forming on a single phased array.

The mechanism to form beams from a single receiving phased array is shown in one-dimension in FIG. 3, which shows beamforming on a single array. Phased-array beamforming is a well-established and understood technology and this invention supports phased array antenna concepts. By way of illustration a specific realisation is considered in which each antenna element (36) is at a distance (37) from its neighbour of less than or equal to half the wavelength of the highest operating frequency; in the example shown in FIG. 3, which is designed to operate in the 2 GHz bands ($\lambda$=15 cm), the spacing (37) is ~7.5 cm. This enables the array to approximately detect the amplitude and phase of the received electromagnetic signal. Each antenna element is connected to a low noise amplifier. In order to form a beam for a flat array, the requirement is to have a linearly increasing signal delay across the width of the array; this can be done in either the analogue or digital domain. The diagram at the top of FIG. 3 shows the relative delays (32) on the y-axis (30) used in producing the beam (35) where the distance across the antenna is plotted on the x-axis (31). The signals from all the antenna elements suitably relatively delayed are then summed to form a composite signal, which is a "beam." The beam size is given approximately by $\lambda$/d where $\lambda$ is the wavelength and d the diameter of the array. In the case of a 2 GHz signal and a 1.5-meter diameter array, the beam would normally be ~5.7° wide. However, by appropriate antenna element "weighting" this can be tailored to widen the beam. If required this enables the beams to be varied to give approximately uniform coverage on the ground as changes in the elevation of the array from points on the ground result in the beam being spread to a greater or lesser extent over the surface.

Phased arrays also have the benefit that, by using recent developments in digital technology, very wide bandwidths can be implemented. The frequency range of recent, planar antenna elements can be as high as 3:1 from the lowest to the highest frequency supported. In such planar systems multiple conducting or partially conducting layers are each situated in planes parallel to each other and at 90 degrees to the axis of the antenna.

Because all the signals from each antenna element are available for any usage, it is practical to apply a different set of delays across the array and sum the second set of signals and form a second beam. As also illustrated in FIG. 3: another beam (34) can be produced by a different set of delays (33). This process can be repeated many times to form many different beams concurrently using the array.

Forming many beams in the digital domain can be readily achieved, the only requirement after digitization is additional processing resources and data bandwidth to communicate or further process all the beam information.

While it is possible to form a large number of beams with an individual phased array, the maximum number of "independent" beams that can carry data unique from all other beams cannot exceed the total number of antenna elements in the array. For example, if an array has 300 independent antenna elements (separated by ~$\lambda$/2 or greater) there can be a maximum of 300 independent beams; more beams than this can be formed but these beams will not all be independent. In this instance the non-independent beams will each transmit and receive the same (or similar) encoded information—these beams may still be utilised by appropriate resource sharing schemes or in other ways relevant to the invention.

Phased arrays can form beams over a scan angle range up to approximately ±60° from the axis normal to the plane of the array. This is due to the geometrical limitation of the array where the illumination area of the elements is reduced as a cosine of the scan angle; also the sensitivity of the beam of the individual antenna elements is reduced due to their being off the centre of the beam. The result is that the illumination area of a horizontal array is limited by the maximum scan angle to approximately 60 km diameter with large single arrays for transmit and receive, and this limit may be extended with more complex shaping of the arrays.

Figure 6:
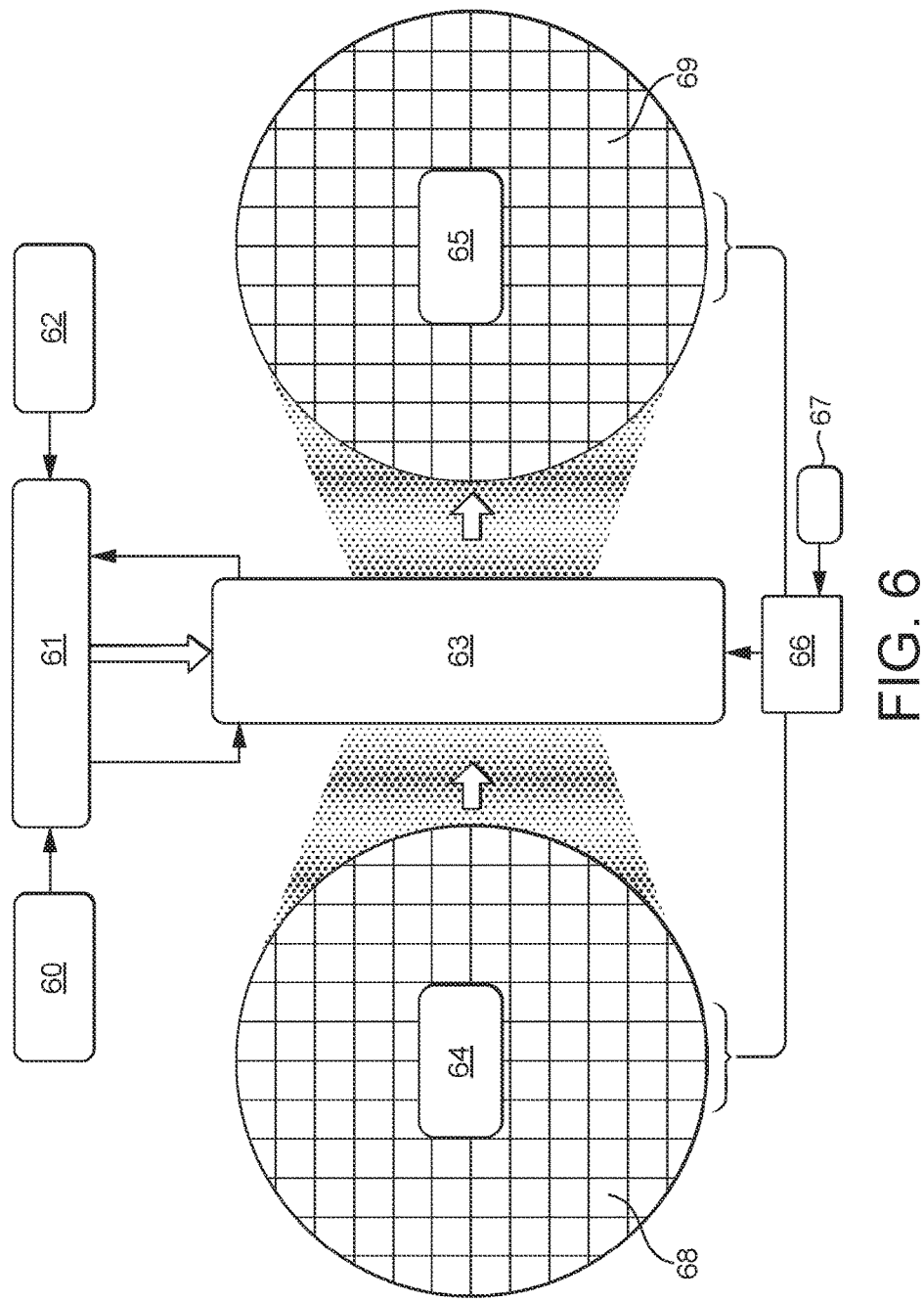
FIG. 6 is a schematic arrangement of an aircraft communication system.

Referring to FIG. 6, the receiving array may consist of many planar dual polarized receive elements (68) in a regular array (64). Two polarisations are preferred for the inter-antenna beamforming techniques due to the need for precise amplitude and phase information; also to ensure the best signal reception at the arbitrarily positioned UE. Each polarization is amplified, filtered and digitized over the receive bandwidth required. The antenna element electronics are conveniently mounted immediately behind the receive antenna element for low noise pickup, simpler assembly and to distribute the heat load over a large area. The digitized signal for each polarization is transmitted to the signal processing system for beamforming.

In one example, the array is 1.5-meters in diameter with antenna elements spaced at 7.5 cm. This results in approximately 315 antenna elements or 630 signal paths. This gives a service area of 60 km diameter broken into ~160 patches (concepts for a modified array that can cover a wider area are discussed later in this document).

A position detection system (60), an orientation detection system (62) and a control and coefficient processor (61) interface with a signal processing system (63) which, in this preferred implementation, needs a highly accurate clock system (66) which can be interfaced in turn to a positioning system (67).

The transmit array (65) is of a very similar design and size as the receive array. It has many dual polarized transmit elements (69). Digitised signals are computed by the signal processing system for each polarization, transmitted to a digital-to-analogue converter, filtered, amplified, and passed to the output power amplifier for transmission. As with the receive array, the element electronics can be mounted behind the transmit elements to distribute the heat load and minimize stray radiation.

Beamforming

The HAP-CELL system utilises beamforming across the multiple aerial antennas to generate narrow cooperative beams to the UE.

The system operates by the antennas, e.g. phased arrays on every platform in a "constellation" of multiple arrays, each forming one of their component signals onto a specific "patch". The signal sent from all the arrays to a specific patch carries essentially the same information content (differences could include, e.g. noise from quantisation and analogue effects), but has a phase delay across the constellation of antennas, thereby forming a very narrow "synthesized beam" from the individual array beams.

The phase delay, or time delay for wide band signals, for the data signal from each antenna to a UE is compensated accurately for the different distances in phase space from individual antennas to the UE. The delay is calculated such that the signal to the UE from every antenna arrives at the same time and is phase coherent at the UE. Signal amplitude from each of the aerial platforms is adjusted such that typically all signals are normalised at the UE, but can be adjusted, for instance to reduce side lobes. These adjustments are known as the coefficients for each signal. A similar process is applied to the signal to each UE within a patch and combined to form the overall patch beam for every aerial antenna. These beam forming instructions can either be calculated on the ground in a processing centre and transmitted as an encoded representation of the patch beam to each aerial antenna or used at the platform to form the patch beams.

For signals transmitted from the UE to the constellation of aerial antennas the processing system similarly applies phase or time delays to the patch beam from every aerial antenna in the constellation and then sums them to form a coherent receive beam on a UE. This combined signal is used to communicate with the wider cellular network. Typically this processing will be carried out at the ground processing centre which receives an encoded representation of the patch beams received at the aerial antenna.

Figure 4:
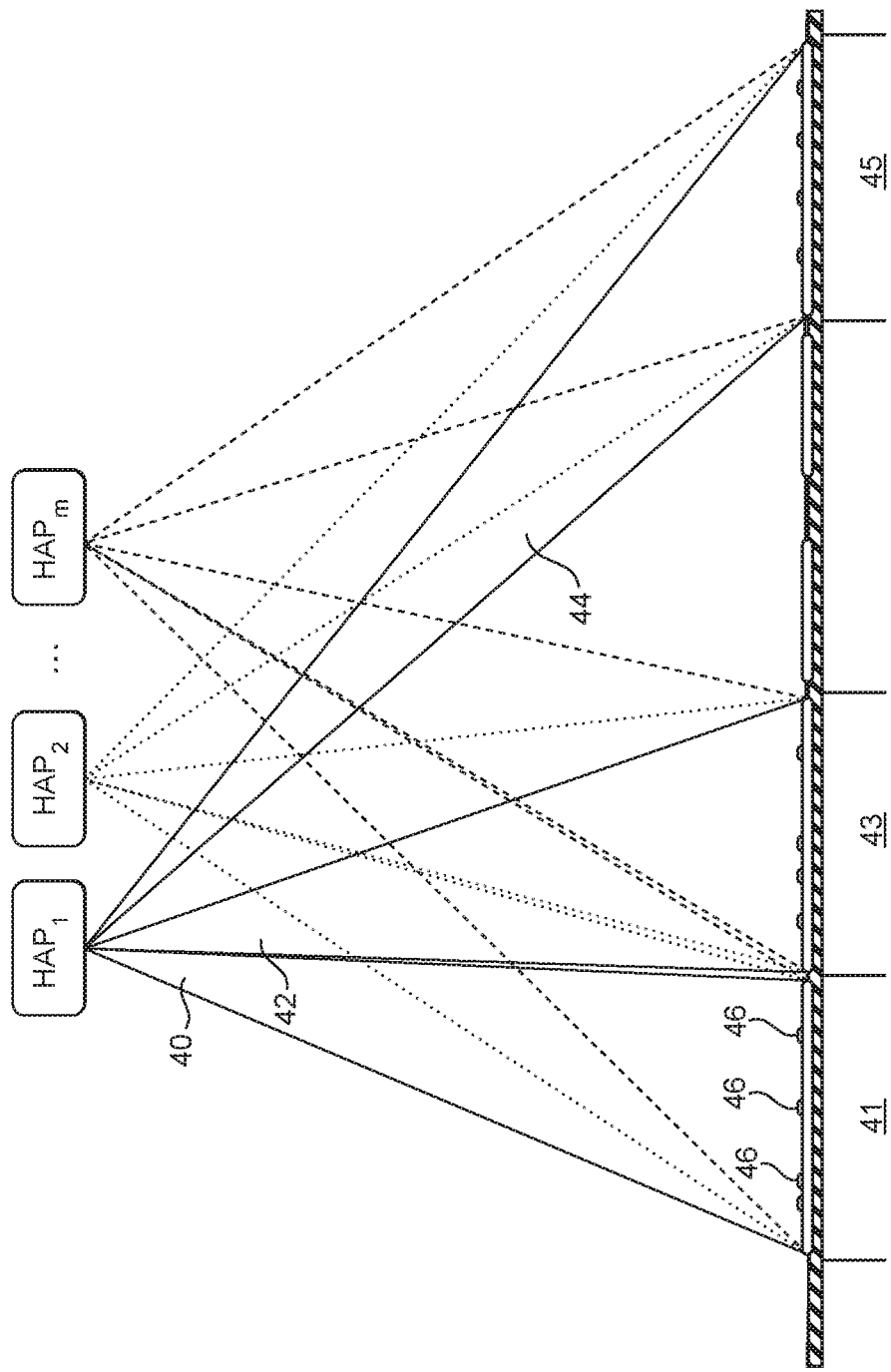
FIG. 4 illustrates beam formation by a constellation of antennas supported by aircraft.

The synthesized beams are computed to become "user beams" which track specific UEs. This is illustrated in FIG. 4, which shows beam formation in the service area, by a constellation of antennas labelled $HAP_1$, $HAP_2$ to $HAP_m$. The antenna on HAP1 is shown producing three beams (40,42, and 44), which are directed at three patches (41, 43, and 45). $HAP_2$ and $HAP_m$ are shown producing similar beams.

The size of the synthesized beam is much smaller: $\sim\lambda/D$ where D is the maximum diameter of the constellation of antennas. If, for example, the antennas are situated within a circle of diameter, D=10 km, at the centre of a service area of 60 km diameter, then for a 2 GHz signal the beam is only 0.1 arc minutes wide; which results in a beam diameter of only 60 cm diameter at ground level directly underneath the antenna constellation or less than 3 meters diameter at the edge of the service area. The small size of the area these user beams interact with is shown by the areas (46).

The minimum size of the area on the ground, the "resolution area," which an independent beam from a single aerial antenna could interact with, varies with its position relative to the aerial antenna. The "maximum beam data rate" (MBDR) that can be transferred to or from a single antenna within a beam is given by the number of bits per second per Hertz bandwidth, multiplied by the bandwidth available. The maximum number of bits per second per Hertz is limited by the signal to noise ratio of the signal, as is well known to those skilled in the art.

The beam sizes can be adjusted to be larger than the minimum beam size for a single antenna, so that area illuminated by each beam may be tailored to the requirements of the operational environment of the system.

If all the aerial antennas are relatively close together compared to the diameter of the service area, these resolution areas will be comparable in size from one antenna to another. If the aerial antennas are far apart, the "resolution areas" from different antennas will be very different in size. There is a limit to the amount of data that can be transferred within one resolution area given by the number of antennas in the constellation multiplied by the MBDR if the resolution area sizes from each of the antennas are similar. The available bandwidth can be split into multiple blocks of resources, e.g. frequency bands, time slots and codes, thereby increasing the number of UEs that can be supported although with a lower data rate available to each UE. Other radio resource sharing techniques can be used. There cannot be more data present in the user beams than is available in the antenna beams.

In the HAP-CELL system, the constellation of aerial antennas effectively operates just as would a single antenna having a dimension that is from 1 to 30 kilometers, preferably from 5 to 20 kilometers. Thus, very narrow beams can be generated.

Weightings on the antenna elements can be varied to control ground based patch sizes based on an optimization function reflecting population density or data rate density, taking into account the orientation and attitude of the antenna platform(s). In this manner if the centre of the constellation is over a large city but at the edge of the service area there is a low population density, beams to and from the constellation may involve only a small fraction of the antenna elements of each array thereby saving power.

Platforms Supporting Antennas

Platforms can be implemented as:

(i) Aircraft that are powered using either solar energy or hydrogen or hydrocarbon fuel to carry the communications equipment at approximately 20 km. The aircraft carry the equipment for communicating with UEs and with the BG stations. Also, they carry the signal processing systems, precise clock and timing units and control computers.

(ii) Free flying aerostats powered by solar cells or other technologies. The aerostats carry the equipment for communicating with UEs and with the BG stations. Also, they carry the signal processing systems, precise clock and timing units and control computers.

Figure 9:
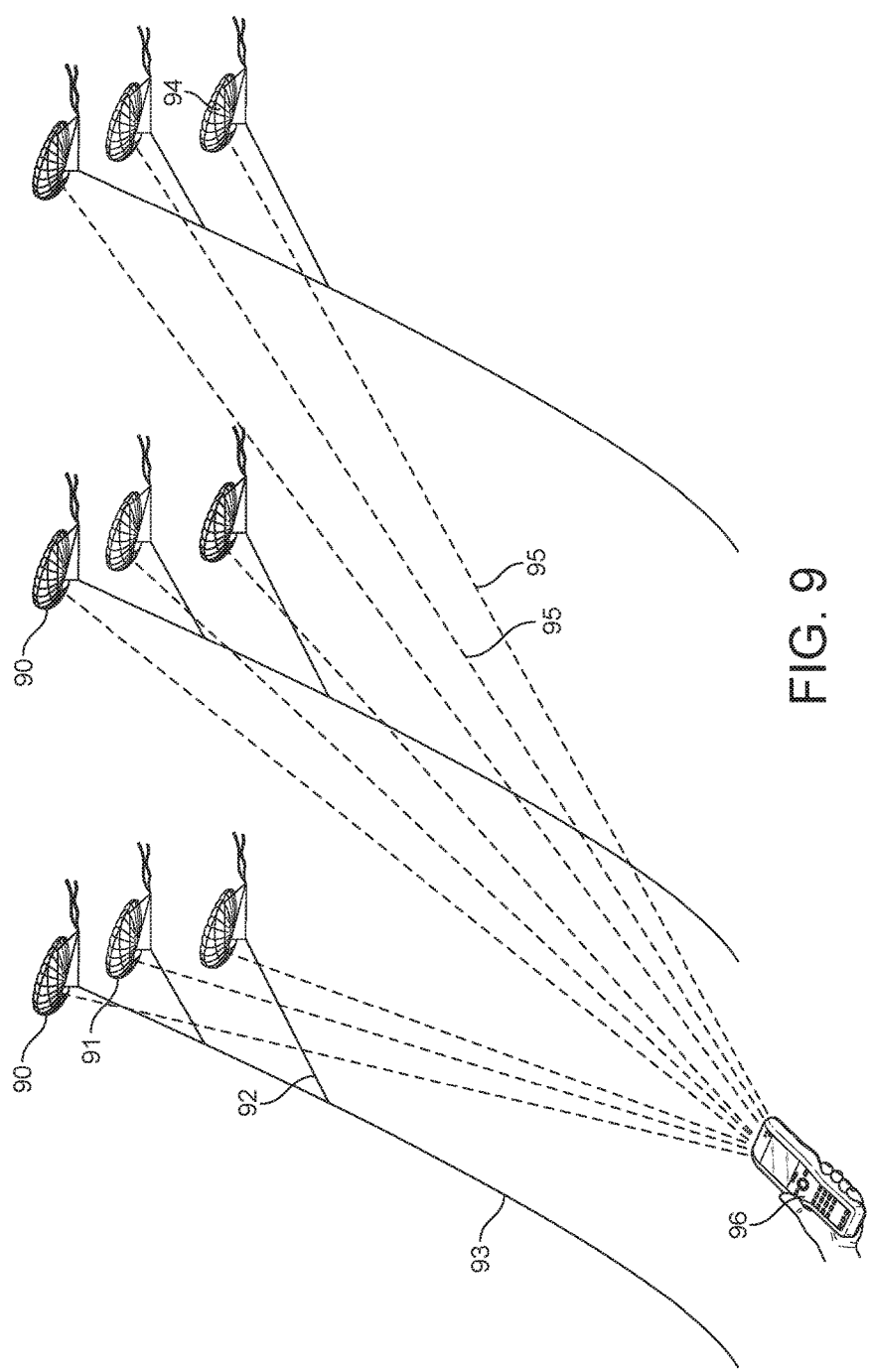
FIG. 9 illustrates multiple platforms supported by tethered aerostats.

(iii) Tethered aerostats powered by hydrogen conveyed along the tether, or supplied with electrical power via the tether or supplied by solar cells situated on or connected to the aerostat platforms. A tethered aerostat supporting one or more tethers can carry a number of platforms at a number of different altitudes with each platform in turn supported by the tether(s). Each platform may also receive additional support from its own aerostat. The tethered platform system carries the equipment for communicating with UEs and with the BG stations, and they may carry the signal processing systems, precise clock and timing units and control computers or this may be ground based. FIG. 9 shows the layout of such a system.

In the case shown there are tethered aerostats (90, 91) connected by tethers either directly to the ground (93) or indirectly (92). Some aerostats (91) are connected indirectly, and some directly (90) to the ground. In the case shown, the antennas (94) are wholly contained inside the envelope of the aerostats. They may be partially contained or not contained at all. UE (96) is communicated to by beams (95) from the aerial antennas (94) in a co-operative manner. At least two antennas communicate with each UE.

(iv) Ground-based antennas based on very high towers or buildings where there is significant movement of the antenna of at least 1/10 of the wavelength of the carrier signal.

(v) Conventional commercial aircraft used for passenger transport supporting additional intermittent aerial antenna capability.

(vi) Space-based satellites.

(vii) Hybrid air vehicles.

The system may consist of one or several types of platform described above.

Platform Communications with UE

The platforms are normally all equipped with at least two phased arrays of equivalent size and number of elements, a transmit array and a receive array, to enable the system to have concurrent transmission and reception for any waveform and multiplexing technique that operates at the selected frequency allocation and bandwidth. It is possible to use a single array, but the electronics required is of greater complexity and weight, and may only support time division multiplexing and not the more usual frequency division multiplexing. The arrays form beams that divide the service area into a number of patches. The patches are treated as "cells" by the cellular telephone network.

The UE may be ground based or could be on a manned or unmanned aircraft at lower altitude than the aerial antennas. The UE could also be carried on some form of transportation technology including but not limited to trains, motor vehicles and shipping.

Backhaul Communications

The HAP-CELL system can provide a "transparent" link between the cellular network and the individual users' devices in a similar fashion as conventional ground based mast based systems. This provides compatibility with the existing cellular network.

The system allows for the possibility of a substantial amount of data communicated between the platforms and the UEs. Thus there has to be at least the same amount of user data communicated through the backhaul system to and from the platform and processing system. There are the following options for transmitting the data from and receiving it to the platforms via the following communication links:

1. Use capacity on the phased arrays used for communication to UE on each platform
2. Use alternative, high capacity links on alternative phased arrays
3. Use single beam point-to-point high capacity links
4. Use free-space optical links to BG stations.
5. Use free-space optical links between platforms, so that a platform in a less well-developed area can communicate by laser to a satellite or aircraft that has a microwave downlink to BG stations. This can be via a series of repeater platforms with redundancy.

Both polarisations could be used independently on the backhaul link, potentially halving the number of BG stations required.

The embodiment described below will use implementation 1 above and share resources on the large arrays to provide both the backhaul communications and the user links.

Much of the technology used in the present invention is used in the telecommunications industry and develops techniques used in radio astronomy for beamforming and beam shaping. The use of one-dimensional phased arrays, the interface specifications, the data encoding techniques, the use of signal processing etc. are all widely used by the existing cellular telecommunication systems. The present invention integration results in a very high performance system that interfaces compatibly into most existing cellular telephone network technology.

Processing System

The HAPS-CELL system is managed by a processing system, which may be a distributed system or, as shown in the figures, FIG. 1 shows a processing centre (1), which is normally ground based, saving weight and power on the aerial platforms. The processing system interfaces to the cellular telephone network (2), and it provides direct control of the signals being used by the platforms to communicate with the UEs.

The processing system may be physically distributed between a processing centre, processing co-located with the aerial antennas and/or backhaul ground stations, and processing services provided by third-party (known as "cloud") providers.

The processing system provides the interface to the cellular network through a defined interface to the cellular network.

The processing system computes for the aerial antennas:
(i) The beamforming coefficients required for the signals received from the UE and BG stations both for antennas and if these are phased arrays, normally but not exclusively the coefficients for the antenna elements.
(ii) The phases and amplitudes for the signals to be transmitted to UE and BG stations.
(iii) All algorithms to implement operational aspects such as positional determination of platforms and user equipment.

For BG stations the processing system can compute and provide
(i) The coefficients for the signals to be transmitted by the BG stations to the aerial antennas.
(ii) The coefficients for the signals received from the BG station antennas and if need be the antenna elements if the BG stations are using phased array antennas.

The BG stations can be linked directly to a processing centre via high-speed connections such as fibre optic data links or direct microwave links.

The signals at the platform are complex in that they define all the characteristics to enable the constellation of platform phased arrays to beamform precisely onto individual users.

All these signal processing and beamforming calculations are performed in the processing system. The processing system may comprise at least one processing centre with some processing required on each platform. Such processing centres are ideally located at ground-level, for simplicity. Preferably however, ground level processing dominates the overall signal processing capability, consuming over 70 percent, preferably over 90 percent of the signal processing electronics electrical power requirements.

The processing system also determines how the system presents itself to the cellular network, including providing the required interface to enable efficient resource allocation.

The processing system may be capable of a further range of enabling functions, as will now be illustrated. The processing system may be capable of determining when the formation of a DF-Cell is required to permit up to the maximum resource allocation to a given piece of user equipment. The processing system will support all resource allocation methods required by the cellular network including, but not limited to, frequency and time multiplexing. The processing system will also determine the frequencies that will be used by each platform. This can be up to the full bandwidth of the frequency allocations or restricting the bands for specific network or mobile phone operators using either overlaid systems according to the present invention or a mixture of ground based antennas and the present system. It would also support co-operative use of multiple operators, assuming suitable agreements can be reached.

The system can also use time division multiplexing or other radio resource sharing techniques.

Programmable signal processing components, Field Programmable Gate Arrays, FPGAs, are now of a power and capability suitable for this system. Such devices are now available that can perform this task, e.g. the Kintex (http://www.xilinx.com/products/silicon-devices/fpga/kintex-ultra-scale.html) family of devices from Xilinx, which feature up to 8 Tera MACs (Tera=$10^{12}$; MAC=Multiply Accumulate, the basic processing operation in digital signal processing)

processing capability and 64×16 Gb/s communication channels using modest power, typically under forty watts.

The signal processing system uses information transmitted from the processing centre to form required beams on the UEs and (if required) on the BG stations. The data in the beams that is formed is retransmitted to users, BG stations or used by the control processors on the aircraft.

As discussed, processing on the platforms is preferably minimised, however there may be at least some processing carried out there which can include:

Reconstruct the coefficients used by the signal processors to form the required beams;

Use information from the position and orientation systems as part of the beamforming process;

Monitor, control and report the status of the aircraft payload systems.

The processing capabilities required are of the order of a conventional PC server, but as a specialist implementation requires less power.

Accurate time determination at the moving aerials is essential to the precise reception and beamforming of the signals.

It has been found that a suitable clock generation uses a GNSS system for long-term (greater than ten's of seconds) accuracy and an oven temperature stabilized crystal oscillator for short-term accuracy. This combination will give the phase precision required for both local aircraft beamforming and beamforming between aircraft. The requirement is to have phase stability for the analogue to digital converters, ADCs, and digital to analogue converters, DACs, to have precise sampling at all times.

Backhaul Ground Stations (BG Stations)

As discussed, the cooperative aerial beamforming system involves the provision of one or more BG stations. The BG stations can provide the communication links to and from the platforms and the processing centre. Each BG station should be able to communicate independently with as many platforms in line of sight as possible, to maximize the data rate capabilities of the platforms.

Typically, there are therefore at least as many beams formed at each BG station as platforms visible from the individual BG stations. Using phased arrays as the communication system at the BG stations will provide this facility. The design of these phased arrays can be similar to those on the platforms.

BG stations provide the high-speed data links between the aircraft and the HAP-CELL processing centre. To reduce the number of BG stations and their associated costs, it is useful for the BG stations to have multi-beaming capability so that they can each communicate with each aerial antenna independently when there is a constellation of multiple antennas, to provide the high data rates required for the network. By this means the data rate to or from each BG station can be increased by a factor equal to the number of aircraft being communicated with over that which would be possible with a single aircraft.

Figure 7:
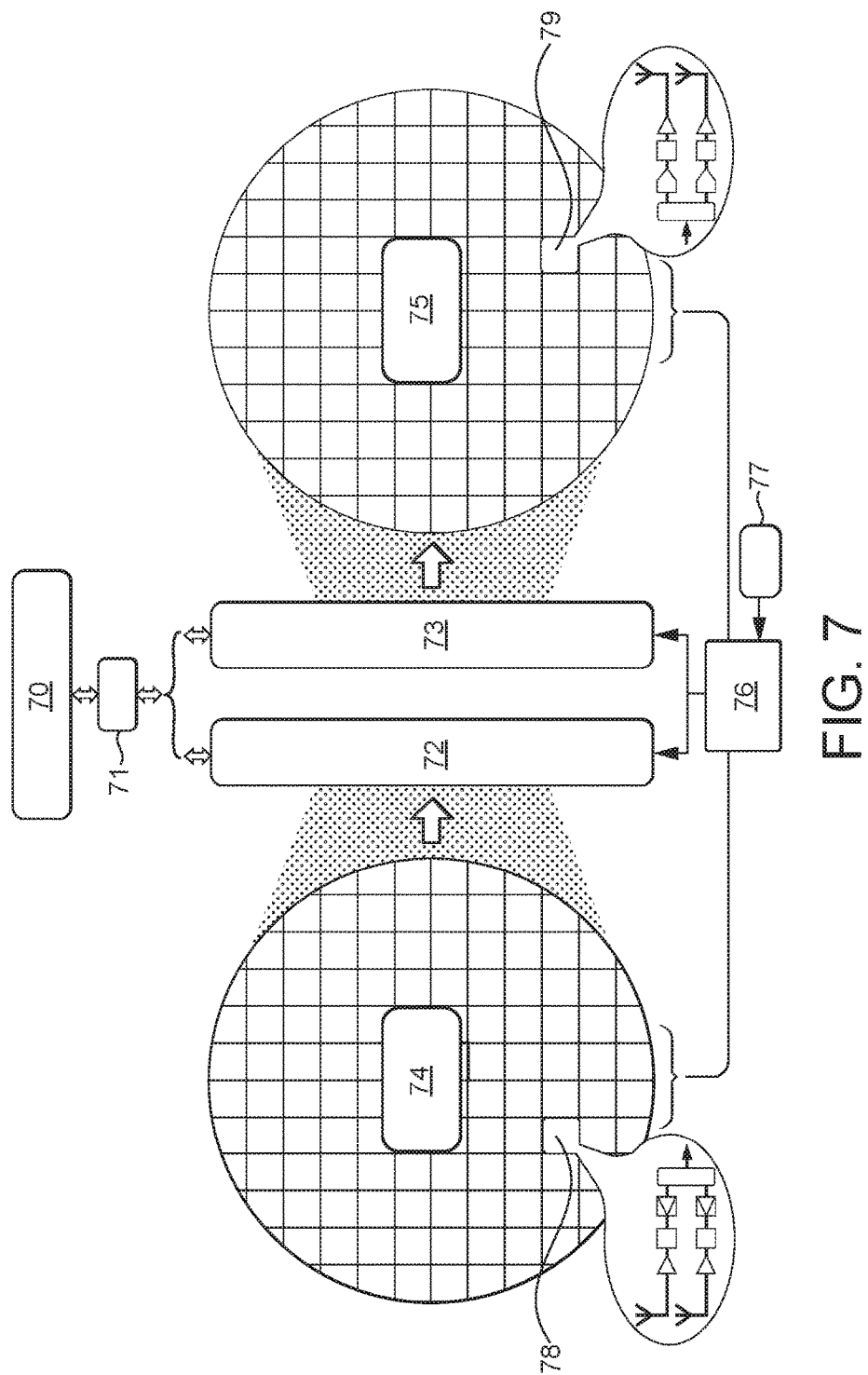
FIG. 7 is a schematic arrangement of a backhaul ground based station (BG Station) system.

An implementation using phased arrays similar to the systems used on the aircraft is illustrated in FIG. 7. As with the aircraft phased arrays there are separate transmit (75) and receive (74) arrays.

The receive array (74) has a large number of elements (78) which provide signals to the receiver processing system (72). The transmit array (75) has a large number of elements (79) which receive signals from the transmitter processing system (73). Both receiver and transmitter processing systems interface (71) with the HAPS-CELL processing system (70). They also can require input from a clock system (76), which in turn receives input from a positioning system (77). BG stations are separated far enough apart for beams from the individual aircraft arrays to resolve them independently with different array beams. This is to provide a sufficient aggregate data rate to every aircraft.

In the example shown, BG stations are under the direct control of the processing system; the processing system determines the amplitude and phase for every array element.

In certain locations where the availability of BG stations is low, it may be advantageous to link one aircraft with another more suitably located over BG stations by laser or free space optical devices. These have been developed in recent years and allow high data rate communication (greater than 1 Giga bit per second) with modest (under 100 W) power consumption and can be of modest weight of less than 25 kg but able to communicate in the stratosphere at distances of at least 60 km, and more preferably of 250 km and on occasion of 500 km or more. With such an arrangement it is possible for one or more aerial antennas to be linked to BG stations many hundreds if not thousands of kilometers distant by utilizing laser links between additional aircraft.

Aircraft Based Communication System

For communicating with the UEs the aircraft are fitted with large phased arrays and associated signal processing and control systems, as illustrated in FIG. 6.

There are two phased arrays: one for receive (64) and the other for transmit (65). This is to ensure that there is full separation between the two paths such that both systems can operate using frequency division duplex, FDD, systems; these are the most popular cellular phone communication links. Two arrays can also support the alternative time division duplex, TDD, systems without the complexity of sharing an array for both transmit and receive.

As discussed above, these arrays both have many individual receive or transmit elements (68, 69); the array signals are combined in the signal processing system (63) to produce the required beams.

Finding the Position and Tracking Users During a Connection

The system can keep track of UEs in a similar fashion to a conventional ground based network. The UE needs to be kept within the cooperative beam when a call or data transfer is in progress.

When using Inter-Aerial Antenna beamforming the beam on the UE could be very focused, of e.g. approximately 1 meter diameter. There are then two further functions required:

To sufficiently identify the required antenna weightings to allow such a focused beam to establish a connection;

To adjust these weightings appropriately during the connection to allow for the movement of the aerial antennas and the UE.

It has been discovered that by using the arrays within the constellation to "focus" on the UE by using progressively more and sometimes different antennas as part of the beamforming process such a process can be achieved. By optimizing the beamformed location for signal strength prior to including more aircraft, then the relevant antenna weightings can be optimized. The focusing process can be speeded up substantially by the UE reporting its GNSS position, if that function is available.

During a connection the UE can move out of the beam. Narrow bandwidth secondary beam(s) can be used to rapidly sample in a pattern around the user's position. Increased signal strength in a particular direction or area can then be used to modify antenna weightings and beam position and direction.

Thus, in the HAP-CELL system, normally the first cooperative beam is generated at a first point in time, and at a second point in time, carrying out a second beamforming operation to ensure that the cooperative beam is directed to the position of the moving user antenna.

Beam Shaping and Sidelobe Minimization

The requirements of beam precision for cellular networks are quite stringent, particularly for energy spillover at national boundaries. A great benefit of using phased array techniques rather than fixed dishes is the ability to modify the beams electronically.

Setting the appropriate amplitude and phase delay on the antenna elements forms and steers beams. When there are many antenna elements, this gives flexibility in shaping the beam to the specific requirements by trading off sensitivity and beam control. The result is that the patches can be well defined and the edges of the service area can be controlled closely to minimize sidelobes or other artefacts to affect neighbouring areas.

Figure 10:
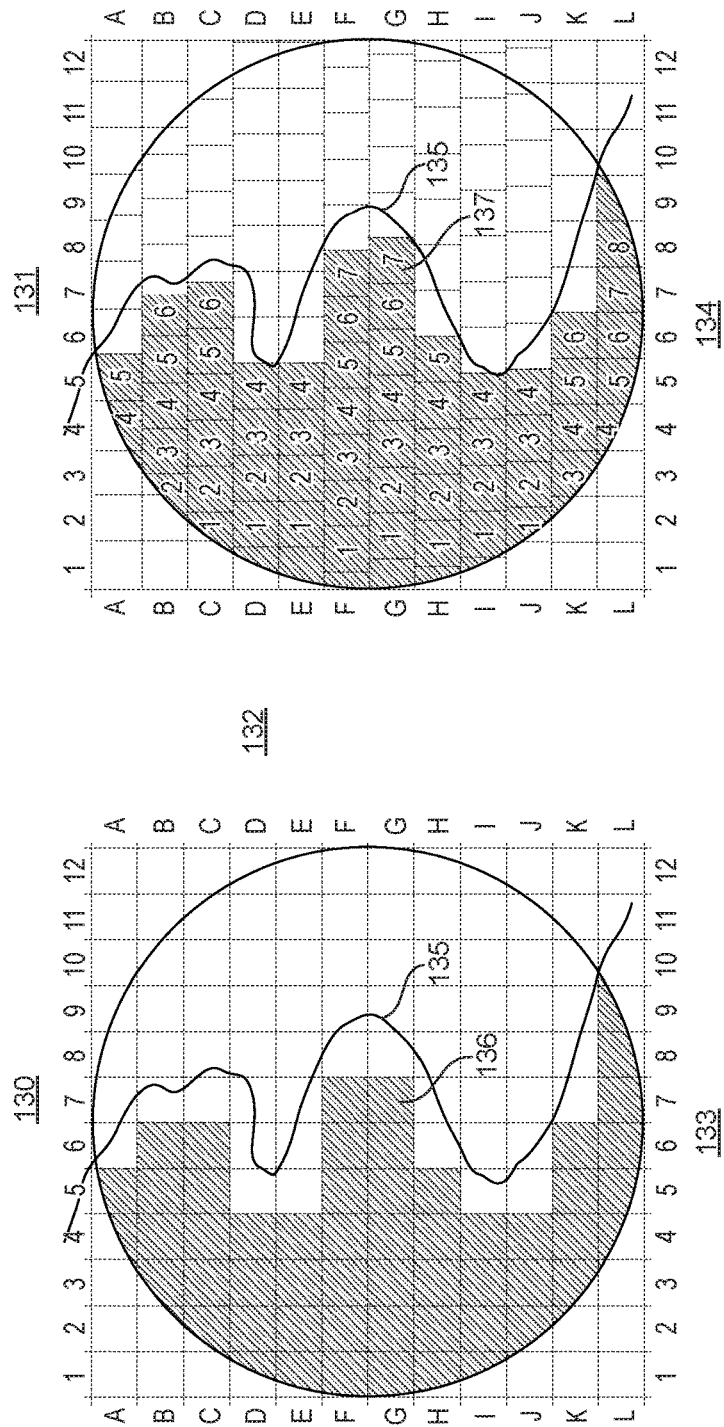
FIG. 10 illustrates an example of how beams from one or more aerial antenna(s) can be modified to give good coverage up to a national boundary but minimize energy spillover.

FIG. 10 illustrates an example of how beams from one or more aerial antenna(s) can be modified to give good coverage up to a national boundary but minimize energy spillover into an adjacent country.

In diagram 130 in FIG. 10, patches of coverage beams from individual antennas or multiple antennas follow a regular grid arrangement where the position of the grid elements is given on the x-axis (133), in this case East-West, by numerals and on the y-axis (132), in this case North-South, by letters. For example the element 136 can be referred to as having location G7. An irregular national border is shown (135).

Shaded squares illustrate to where energy is being transmitted by the aerial antenna system. It can be seen that to ensure low spillover of energy there is an area next to the border where little energy is transmitted, for example in patches A6, B7, C7, D5, E5, F8 and so forth.

Diagram 131 in FIG. 10 shows the same area, with the same y-axis (132) and a comparable x-axis (134) but with modification of the antenna element and antenna phasing—and if need be amplitude, to move the patches to the left or right to more closely follow the national border. For example cell G7 (136) has moved, along with its row (G1 to G5) in an easterly direction so it has become located at a new position (137). The uncovered area closer to the national border has been significantly reduced.

The synthesized beams formed using Inter-Antenna beamforming can be similarly controlled, trading sensitivity for beam-shape to minimize artefacts and actively control beamsize.

Data Rates

The data rate available depends upon the bandwidth available from the band that is in use. For this embodiment, it is assumed that the band is LTE Band 1 (other frequencies are also available):

| Uplink: | 1920 MHz to 1980 MHz | 60 MHz bandwidth |
|---|---|---|
| Downlink: | 2110 MHz to 2170 MHz | 60 MHz bandwidth |

In certain embodiments the links to individual UEs will only use the bandwidth required for the function being used, hence the bandwidth can be sub-divided to service as many users as possible.

The data rates through an example HAP-CELL system are shown in Table 1. As can be seen, this is using Band 1 frequencies and 50 aircraft in a fleet. The data rates per link are dependent upon the signal to noise ratio of the link; hence there is an expectation of higher data rates in the same bandwidths for the backhaul links than to the UEs. This is because the connection to the backhaul can be much better managed due to the fixed, outdoor nature of the equipment and the potential for using higher transmission power and larger antennas than for mobile UE.

As can be seen, the maximum data rate to the UE is very high, assuming the use of clear, high SNR connections. As with all cellular networks, the data rate will be adjusted for the actual link performance.

There is a very strong trade-off of the number of BG stations and the power that can be used for each link. It is worth noting that the dominant data communications will be between the network and the user, with typically a lower data rate on average on the return path. This means that a higher power can be used from the ground stations to the aircraft for a higher number of bits per Hertz for a better spectral efficiency; also, a higher power for transmission from the aircraft than is used by the user for enhanced data rate on that link.

Use of 28/31 GHz Bands

There are frequency bands at 28 GHz and 31 GHz allocated by the International Telecommunications Union to HAP downlink and uplink communications as follows:

| Downlink: | 27.5 GHz to 28.35 GHz | 850 MHz bandwidth |
|---|---|---|
| Uplink: | 31.0 GHz to 31.3 GHz | 300 MHz bandwidth |

These provide considerably more bandwidth than the 2 GHz frequencies commonly used for mobile networks, but are harder to implement with conventional electronics—particularly as a phased array.

TABLE 1

Example HAP-CELL system, 50 aircraft, 1.5 m 2 GHz single arrays (values used for indicative sizing of the system)

| System | Value | Comments |
|---|---|---|
| No. of Aircraft | 10 to 50 | Aircraft in a single fleet |
| No. of BG stations | 157-416 | This depends upon encoding and number of polarisations on backhaul links. |
| Bandwidth | 60 MHz | LTE Band 1: Chosen band for illustration purposes |
| Wavelength, λ | 15 cm | ~2 GHz |
| Aircraft height | 20 km | Lower stratosphere and well above commercial airspace |
| Service area diameter | 60 km | Within max. scan angle of aircraft phased arrays allowing for pitch and yaw of aircraft |

TABLE 1-continued

Example HAP-CELL system, 50 aircraft, 1.5 m 2 GHz single arrays (values used for indicative sizing of the system)

| System | Value | Comments |
|---|---|---|
| Platform mounted phased array: | | |
| Diameter | 1.5 m | Selected to fit on the aircraft with good performance |
| Number of antenna elements | 315 | $\sim 1.5^2 * \pi / (4 * (0.075)^2)$. (Area of array)/(area of antenna element) |
| Polarisations | 2 | Dual polarization for beamforming and high reliability for user links. |
| Max. antenna scan angle | 60° | Physical limitation, $20\tan(60°) = 34.6$ km, defines Service area |
| No. of array beams formed | ~160 | 50% × number of antenna elements: The number of patches is restricted for good definition of the edges. |
| Patch size | 4.7 km × 4.7 km | Defined by the size of the arrays |
| Backhaul data links: | | |
| Implementation | Phased array beams | Uses additional virtual patches on the aircraft phased arrays |
| Polarisations | 2 | Dual polarization, for beamforming performance. In principle could use separate polarisations for data - but not considered here. |
| Modulation | 256-QAM | 8-bit/symbol. |
| Data rate per link (max) | 480 Mb/s | 8-bit/s/Hz * 1 polarisations |
| Data rate per link (min) | 360 Mb/s | 6-bit/s/Hz (64-QAM) * 1-pol |
| Data rate per BG station | 18 Gb/s | Direct communication with 50 aircraft (in this example) - 1 Polarisation |
| User data links: | | |
| Patches | 160 | For a 60 km dia. service area with 1.5 km patches |
| Polarisations | Identical | Identical information to avoid phone orientation issues |
| Modulation, max | Up to 64-QAM | 6-bits/symbol. This is the fastest modulation on very good links |
| Modulation, average | 2-bit/symbol | The average data capacity per link. |
| Data rate max for 1 user | 360 Mb/s | The absolute max data rate with full BW and 64-QAM |
| Data rate per aircraft (typ.) | 19.2 Gb/s | 120 Mb/s per patch * 160 patches |
| System Data rates: | | |
| Data rate per patch, max | 6 Gb/s | 120 Mb/s per plane, 50 planes |
| Data rate over Service area, max | 960 Gb/s | Assuming 50 planes in fleet in line of sight |

Power Requirements for Aircraft Payload

The payload power usage on the aircraft considered is for the communications arrays, the digital processing systems on board and the control and positioning systems. Keeping the aircraft payload power requirements low is important for the limited power availability in either the solar powered aircraft or hydrogen-powered aircraft operating at high altitude.

For the phased array receivers and transmitters the power will scale as the number of antenna elements. Performing as much processing as is practical in the ground based processing facility minimizes the processing requirements at the aircraft. The power for the large number of digital interfaces will dominate the processing power.

Estimates for power consumption are shown in Table 2. This is an example calculated for an aircraft incorporating two 1.5 m diameter phased arrays for transmit and receive. Each array has 315 dual polarization antenna elements; each array therefore has 630 signal channels. The power requirements are for ~1.6 kW with these arrays.

The elements of the processing system located on the platform are implemented using standard components and as such will benefit over time from the improvements in processing available per unit of power consumed.

This would scale almost linearly with the number of elements or with the diameter of the arrays squared. Hence 3-m diameter arrays would be approximately four times this power requirement.

TABLE 1

Estimated power requirements for airplane with 2 × 1.5 m 2 GHz arrays

| Subsystem | Power each (W) | Number | Power total (W) | Comments |
|---|---|---|---|---|
| Receive array: | | | | |
| LNA & gain chain | 0.5 | 630 | 315 | |
| Digitisation & communications | 0.2 | 630 | 130 | |
| Power losses | | | 45 | 10% power distribution losses |
| Transmit array: | | | | |
| DAC & communication | 0.2 | 630 | 130 | |
| Power amplifier | 0.5 | 630 | 315 | Assuming 250 mW RF power per polarization Tx, 50% efficiency |
| Power losses | | | 45 | 10% power distribution |
| Signal processing: | | | | |
| Processing | | | 200 | 10 FPGA's at 20 watts (processing) each |

TABLE 1-continued

Estimated power requirements for airplane
with 2 × 1.5 m 2 GHz arrays

| Subsystem | Power each (W) | Number | Power total (W) | Comments |
|---|---|---|---|---|
| Signal transport Control, clocks, orientation: | 0.1 | 630 | 65 | Inter-FPGA links |
| Estimate | | | 400 | Substantial processing resources |
| Total | | | 1635 | |

Effect of Aircraft Based Communications on Mobile Users

Communication links between aerial antennas and BG stations will normally be at above 30 degrees elevation resulting in a consistent signal for a given location. For UE the signals to and from the aerial antenna will often be passing through roofs of buildings, which will result in significant losses. However, in large systems, with many aircraft over adjacent, or overlapping service areas, then there is a high likelihood of signals coming in obliquely through windows and walls, which are typically more transparent to the signals.

The aircraft are up to 35 km away and have a round trip link of more than 70 km; the processing will have some buffering delays. The delays will not add up to more than a few milliseconds which is well within current mobile network specifications of <30 ms or proposed 5 G specifications of <5 ms.

Multiple Service Areas

Figure 8:
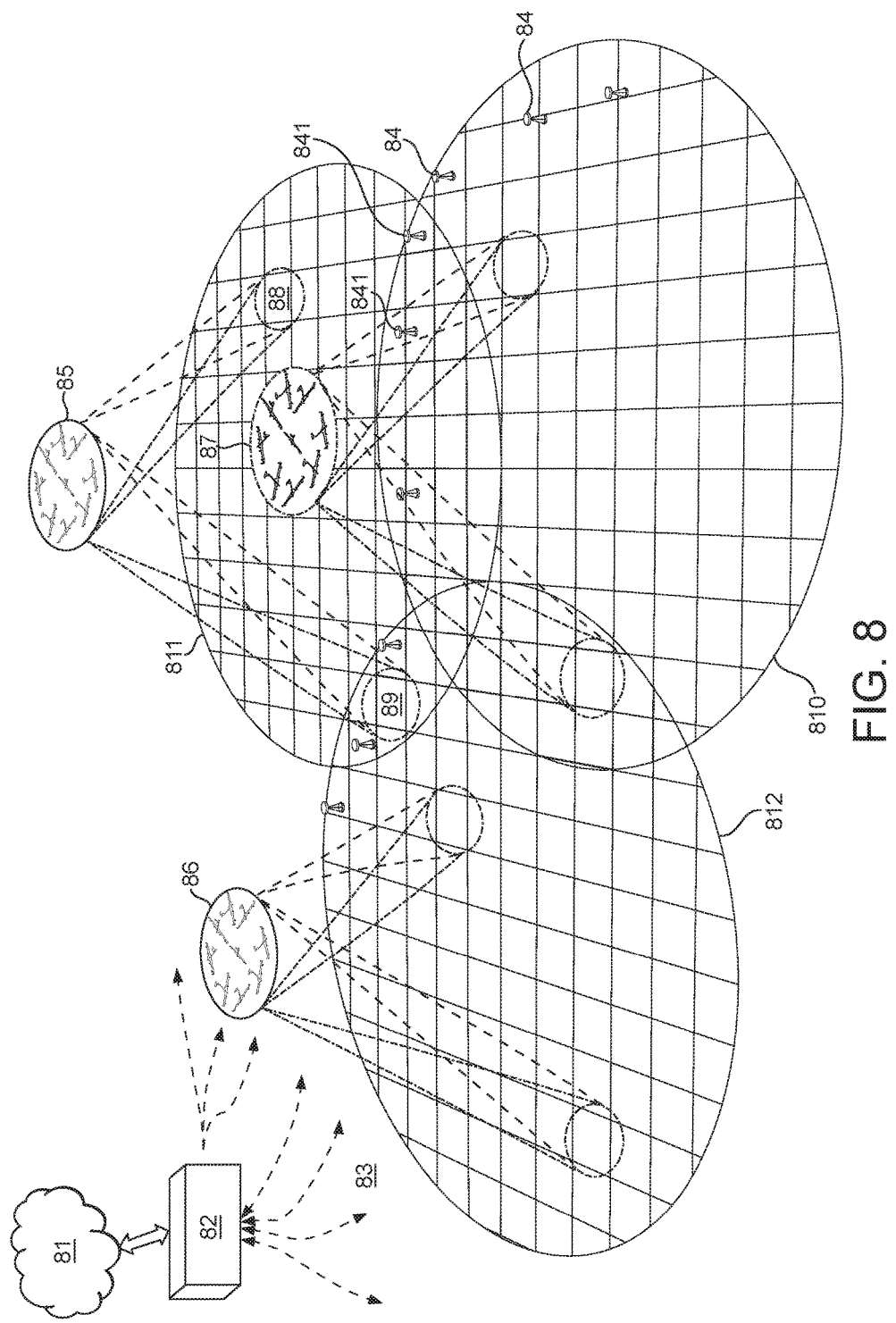
FIG. 8 illustrates multiple HAP-Cell systems.

The HAP-CELL system is intended for use over large areas. For densely populated areas, e.g. major cities, there may need to be multiple fleets of aircraft serving multiple service areas. The system readily scales in this fashion and economies of infrastructure and additional communication capabilities become available. A multiple system is illustrated in FIG. 8. There are three fleets of aircraft (85, 86, 87) identified. These form beams on patches either in their unique illuminated area, e.g. (88) or overlapping areas, e.g. (89). The cellular network and Internet (81) interfaces with one or more processing centres (82), which are linked by fibre optic cables or by microwave (83) to BG stations (84 or 841). Each service area (810, 811, 812) is approximately 60 km in diameter. As can be seen, the service areas can overlap which provides higher total data rate for users. There is also the benefit of improved coverage, for example, if a user is shielded from a fleet of aircraft by being on the "other side" of a building, then there is likely to be coverage from an adjacent fleet.

Due to the user beam from a fleet of aircraft being "private" to an individual user there is no significant interference from adjacent fleets, or beams from adjacent fleets that are spatially separated.

There will be a significant saving in infrastructure. BG stations (841) can service more than one fleet of aircraft if they are suitably positioned. The BG stations form beams to each aircraft within a fleet, consequently, provided the fleets are within range then a BG station can service all the fleets within 30 km to 35 km.

The design of an area's coverage should consider how a number of aircraft, e.g. 50-100, should be deployed in fleets to have maximum benefit. There may be more, smaller fleets or fewer large ones with appropriate degrees of service area overlap. The details will depend upon the population density and other factors, but the HAP-CELL system can allow these trade-offs to be made.

Improving the backhaul data provision according to the present invention supports the benefits described below:

Summary of Benefits of the Aerial Inter-Antenna Beamforming System

Wide coverage area: The horizon for an antenna on a platform at 20 km altitude is at approximately 500 km radius. The elevation of such an instrument from any particular location on the ground is defined as the angle the instrument is above the horizontal at that point. For the platform to be above 5 degrees elevation, any location on the ground will be within a circle of radius 200 km centred directly below the platform. For elevations greater than 30 degrees the location must be within circle of radius 35 km centred below the platform. The latter constraint is appropriate for communications between the ground and a platform carrying only phased arrays situated in a horizontal plane. The former constraint may be appropriate for more complex array geometries but signal strength will become a limiting factor at distances over 100 km which is discussed later.

Low installation cost: Use of platforms reduces the need for ground installations that are both time-consuming to install and expensive to run. Existing ground installations can be used in conjunction with the system to greatly increase capacity and coverage.

High data rate links: The traditional operation of a mobile network divides the network into a set of "cells." Multiple UEs within a cell must share the available resources (signal bandwidth and communication power), which determine the maximum data rate to a user either by radio resource sharing techniques, for example, but not exclusively, sharing bandwidth or time multiplexing. A key element of HAP-CELL is that inter-antenna beamforming is used to create a DF-Cell centred on a specific device. This permits all the resources which can be made available by the implemented protocol to be used by a single device. Resource sharing as in standard implementations, is also supported by the invention.

Focused RF power at the user: Due to Inter-Antenna beamforming the power at the precise user location is increased. This minimizes the power usage on the platform and improves link quality. This is described in detail in Tables 2 and 3.

Scalable capability: The number of users and data rate can be increased easily and quickly—without normally the need for additional ground based infrastructure—by adding more platforms in the same area. The addition of extra BG stations can normally be avoided unless very large capacity increases over the previous infrastructure are needed. This feature, in itself, provides substantial resilience in the system. For example, losing one platform out of ten similar platforms, due to an equipment fault or maintenance or temporarily being unavailable due to flight patterns, would reduce the capacity of the system by 10%, but still give complete coverage within the service area. Similarly, losing one ground station out of a hundred would also only lose 1% of the communication data rate capability. This is significantly better than the loss of a standard mobile phone cell mast where all users within the cells it controls will lose the signal.

Coverage area can be accurately tailored: Phased array and beamforming technology enables the coverage area to be more accurately controlled than with ground-based systems. This is important for operation close to country borders.

For reliable communication, the beamforming technology needs to manage the effects of reflections such as from walls; or diffraction effects such as from the edges of intervening objects, such as the roofs of buildings, if the UE is ground based. Ideally the antennas on many of the platforms are in line-of-sight or close to it from the UE.

TABLE 3

| Glossary of terms used in this document | |
|---|---|
| ADC | Analogue to digital converter. Within the HAP-CELL systems converts the analogue RF signal to digital data stream for signal processing. |
| Algorithm | A process or code by which the power levels at a particular UE can be set. This might be to optimise the powers to antenna elements to ensure a minimum power level for all UE's or to ensure that given UE's had a higher power level. |
| Antenna | A phased array or conventional antenna. |
| Antenna element | An individual transmitting or receiving antenna within a phased array. Each has an individual electronic system for linking to a signal processing system. |
| Antenna weightings | Typically complex numbers that are used within the signal processing chain to adjust the amplitude and phase of the signals to and from individual antenna elements to form the desired beams from an antenna or constellation of antennas. |
| Backhaul communications | The data communication links from the aerial platforms to the ground and ultimately to the HAP-CELL processing centre. |
| Beam | Directional signal transmission or reception from an antenna |
| Beamforming | Beamforming is a signal processing technique used for multiple antennas or in the case of phased arrays, antenna elements, to give directional signal transmission or reception. This is achieved by combining the signals transmitted or received so that at particular angles they experience constructive interference while others experience destructive interference. |
| Beamwidth | The angular beamwidth, as understood by practitioners skilled in the art, depends upon the ratio of the wavelength of the radiation used in said communications system divided by the separation between pairs of aerial antennas; for the conditions envisaged for this invention may be designed to be a wavelength of 15 centimetres and an aerial antenna separation of approximately 10 kilometres results in a beamwidth of less than 50 micro radians and beam size on the ground of less than 2 metres |
| Beamforming coefficients | Typically, these are complex numbers that are used within the signal processing chain to adjust the amplitude and phase of the signals to and from individual antenna elements to form the desired beams from an array or constellation of arrays. |
| BG stations | Backhaul ground stations. The ground based radio links to each of the platforms. |
| Cell | The logical functionality provided within an area on the earth's surface supplied with radio service. Each of these cells is assigned with multiple frequencies. |
| Constellation | A number of antennas supported by HAPs operating cooperatively over the same service area to provide communications to many UEs. |
| Conventional Antenna | An antenna which is not a phased array |
| Cooperative beam | A highly directional signal transmission or reception formed by coherently aligning beams from multiple antennas mounted on aerial platforms. |
| Correlating | Correlating is a mechanism to cross-multiply the signals to or from pairs of antenna elements, this is a fundamental part of interferometry to form the Fourier transform of the incoming or outgoing signals. |
| DAC | Digital to analogue converter. Within the HAP-CELL system converts a digital data stream into an analogue RF signal for amplification and transmission via an antenna element. |
| DBF | Digital beam-forming |
| Femtocell | The area, normally on the ground, which is intersected by a beam carrying information to and from a piece of UE and at least three aerial antennas involved in inter-antenna cooperative beam forming. |
| Dynamic femtocell (DF Cell) | A femtocell that is moved by changing antenna weights. |
| Fleet | Fleet of platforms supporting a constellation of antennas. |
| HAP | High Altitude Platform. This is the vehicle that carries the communications equipment. It can e.g. be an unmanned aircraft, tethered balloon or untethered balloon. |
| HAP-CELL | High altitude platform cellular system, which refers to an example of an implementation using HAPs to provide cellular communications. |
| HAP-CELL Processing centre | A facility associated with one or more HAP-CELL systems to control the communications to and from BG Stations, HAPs, UEs and the cellular network. |
| Macrocells | A cell in a mobile phone network that provides radio coverage served by a high power cellular base station. |
| MBDR | Maximum Beam Data Rate from a single antenna in a independent beam |
| MBH | Multiple beam horn (antennas) |
| Microcell | A microcell is a cell in a mobile phone network served by a low power cellular base station, covering a limited area such as a mall, a hotel, or a transportation hub. A microcell uses power control to limit the radius of its coverage area. |
| Patch | The patch is a specific area, normally on the ground, which can be illuminated by every antenna in the constellation with an independent beam. |

TABLE 3-continued

Glossary of terms used in this document

| Term | Definition |
|---|---|
| Payload | The equipment carried on a Platform. |
| Phased Array | A type of antenna consisting of many small antenna elements, which are controlled electronically to form one or more Phased Array Beams. Phased arrays can be used on the HAPs or BG stations |
| Phased Array Beam | The electromagnetic beam formed by a phased array. Phased array beams from a HAP illuminates a patch. |
| Platform | The platform that carries the payload - an aircraft, tethered aerostat or free flying aerostat. |
| Service Area | The area of ground over which communications coverage is provided by one or more HAP-CELL aircraft. A service area is split into many patches. |
| Spread Spectrum Technologies | A technique in which a telecommunication signal is transmitted on a bandwidth considerably larger than the frequency content of the original information. |
| Synthesised Beam | The beam formed by beamforming HAPs in a constellation. The beam is small and illuminates a "dynamic femtocell." |
| Transmitting data | Data can be transmitted over an RF link such as the aerial antennas. Can also refer to communicating data within a system over local links such as fibres or wires. |
| UE | See User Equipment. |
| User Equipment | The equipment used by an individual user, typically but not exclusively a mobile phone, tablet, or computer. Abbreviated to UE. |
| User Beam | A synthesised beam that tracks specific user equipment |
| Weightings | See Antenna weightings |

The invention claimed is:

1. A process for cooperative aerial inter-antenna beamforming for communication between (a) multiple moving platforms, each platform having an aerial antenna mounted thereon, such that the aerial antennas have variable positions and orientation over time, and (b) at least two backhaul ground stations, wherein each backhaul ground station comprises a ground based antenna; the process involving transmitting data relating to the positions of the aerial antennas to a processing system, the processing system calculating and transmitting beamforming instructions to the ground based antennas, the ground based antennas thereby transmitting or receiving respective component signals for each aerial antenna, the component signals for each aerial antenna received or transmitted by the ground based antennas having essentially the same information content but differing in their phase and usually amplitude, so as to form a cooperative beam from a cooperative sum of the signals between the ground based antennas and the aerial antennas.

2. The process according to claim 1, wherein there are at least three aerial antennas.

3. The process according to claim 1, wherein use of two orthogonal polarisations for each transmit or receive beam for backhaul communications between the backhaul ground stations and the aerial antennas is employed to provide two separate data streams which increases the data transfer rate on backhaul links by up to double that of a conventional link.

4. The process according to claim 3, wherein ground level processing dominates the overall signal processing capability, consuming over 70 percent of signal processing electronics power requirements.

5. The process according to claim 1, wherein the positional and orientation data is transmitted by the aerial antennas to at least one backhaul ground based station of the at least two backhaul ground stations.

6. The process according to claim 1, wherein the processing system comprises a ground based processing centre.

7. The process according to claim 1, wherein at least one aerial antenna is at an elevated location of at least 10,000 m in the stratosphere.

8. The process according to claim 1, wherein at least one of the aerial antennas are phased array antennas.

9. The process according to claim 1, wherein the platforms comprise unmanned solar powered aircraft, airships or hybrid air vehicles.

10. The process according to claim 1, wherein the platforms comprise unmanned hydrogen powered aircraft.

11. The process according to claim 1, wherein the platforms comprise tethered aerostats.

12. The process according to claim 1, wherein the platforms comprise free-flying aerostats.

13. The process according to claim 1, wherein the platforms comprise hydrocarbon-fueled aircraft.

14. The process according to claim 1, wherein the platforms comprise satellites.

15. The process according to claim 1, wherein at least some of the platforms use different antennas for transmission or reception.

16. The process according to claim 1, wherein data rates to and/or from a user equipment antenna exceed 10 Mbps.

17. The process according to claim 1, wherein the use of lasers or free space optical devices is employed to provide a communication link of backhaul data between aerial antennas involved in cooperative inter antenna beamforming.

18. A process or apparatus according to claim 17, wherein the platforms comprise a control system to adjust the position of the platform so that it does not break line-of-sight of a laser or free space optics communication stream.

19. Non-transitory computer-readable media encoded with a computer program comprising computer implementable instructions which when implemented on a computer cause the computer to perform the process according to claim 1.

20. An apparatus for providing a communication network, for communication between (a) multiple moving platforms, each platform having an aerial antenna mounted thereon, such that the aerial antennas have a variable position and orientation over time, and (b) at least two backhaul ground stations, wherein each backhaul ground station comprises a ground based antenna; the network involving a processing system that calculates and transmits beamforming instructions to the ground based antennas, the ground based antennas thereby transmit or receive respective component signals for each aerial antenna, the component signals for each aerial antenna having essentially the same information content but differing in their phase and usually amplitude, thereby forming a cooperative beam from a cooperative sum of the signals between the ground based antennas and the aerial antennas.

21. A method of receiving and/or transmitting data, applications and/or content to an antenna on user equipment, the method utilising the apparatus according to claim 20.

* * * * *